United States Patent
Matousek et al.

(10) Patent No.: US 10,716,261 B2
(45) Date of Patent: Jul. 21, 2020

(54) SERIES HYDRAULIC MOTOR SYSTEM FOR DRIVING AIR MOVING FANS ON AN AGRICULTURAL HARVESTING COMBINE

(71) Applicant: Tribine Industries LLC, Logansport, IN (US)

(72) Inventors: Robert A. Matousek, Valley Center, KS (US); Darren J. Nelson, Hutchinson, KS (US)

(73) Assignee: Tribine Industries, LLC, Logansport, IN (US)

( * ) Notice: Subject to any disclaimer, the term of this patent is extended or adjusted under 35 U.S.C. 154(b) by 72 days.

(21) Appl. No.: 16/202,138

(22) Filed: Nov. 28, 2018

(65) Prior Publication Data
US 2019/0159404 A1    May 30, 2019

Related U.S. Application Data

(60) Provisional application No. 62/591,266, filed on Nov. 28, 2017.

(51) Int. Cl.
| | |
|---|---|
| *A01F 12/44* | (2006.01) |
| *A01F 12/56* | (2006.01) |
| *A01D 41/12* | (2006.01) |
| *B62D 53/02* | (2006.01) |

(52) U.S. Cl.
CPC ............ *A01F 12/444* (2013.01); *A01D 41/12* (2013.01); *A01F 12/56* (2013.01); *B62D 53/021* (2013.01)

(58) Field of Classification Search
CPC ................ A01D 41/12; A01D 41/1276; A01D 41/1277; A01F 12/46; A01F 12/56; A01F 12/48; A01F 12/444; A01F 12/448
USPC ............................................ 460/100, 112, 97
See application file for complete search history.

(56) References Cited

U.S. PATENT DOCUMENTS

| 4,531,528 | A  | * | 7/1985  | Peters ..................... | A01F 12/44 |
|---|---|---|---|---|---|
| | | | | | 460/97 |
| 10,143,135 | B2 | * | 12/2018 | Xu ....................... | A01D 41/1276 |
| 10,321,634 | B2 | * | 6/2019  | Bilde .................... | A01F 12/444 |
| 2005/0245301 | A1 | * | 11/2005 | Redekop ............ | A01D 41/1243 |
| | | | | | 460/112 |

* cited by examiner

*Primary Examiner* — Robert E Pezzuto
(74) *Attorney, Agent, or Firm* — Mueller Law, LLC; Jerry K. Mueller, Jr.

(57) ABSTRACT

An airflow system for a rotary harvester includes a cleaning charge fan assembly, a cleaning fan assembly, and bonus sieves with fan assemblies. Each of the fan assemblies is powered by a hydraulic motor. By linking the charge fan motor, the left/right tailings fan motors, and the cleaning fan motor in a series hydraulic circuit, each of the motors will increase/decrease in speed at the same time and by the same proportional amount.

2 Claims, 21 Drawing Sheets

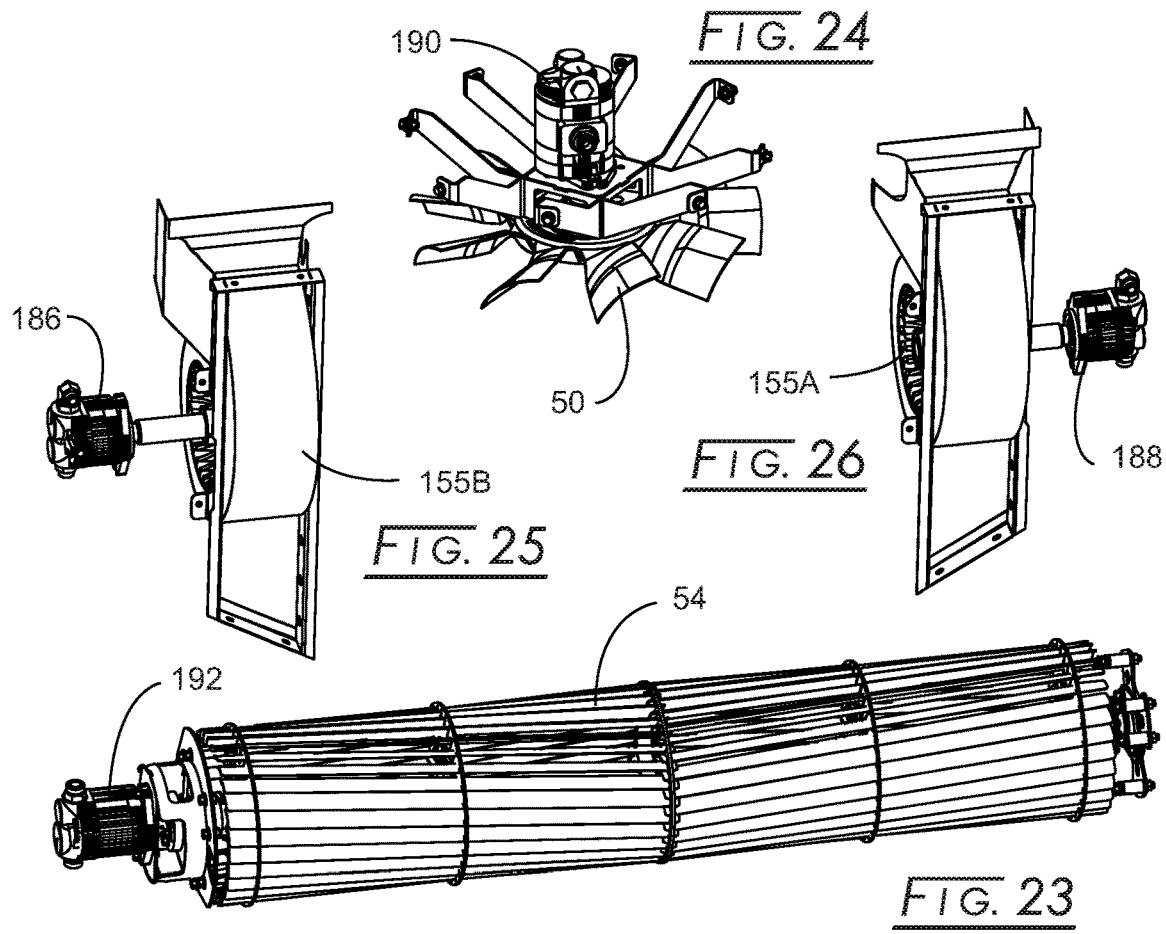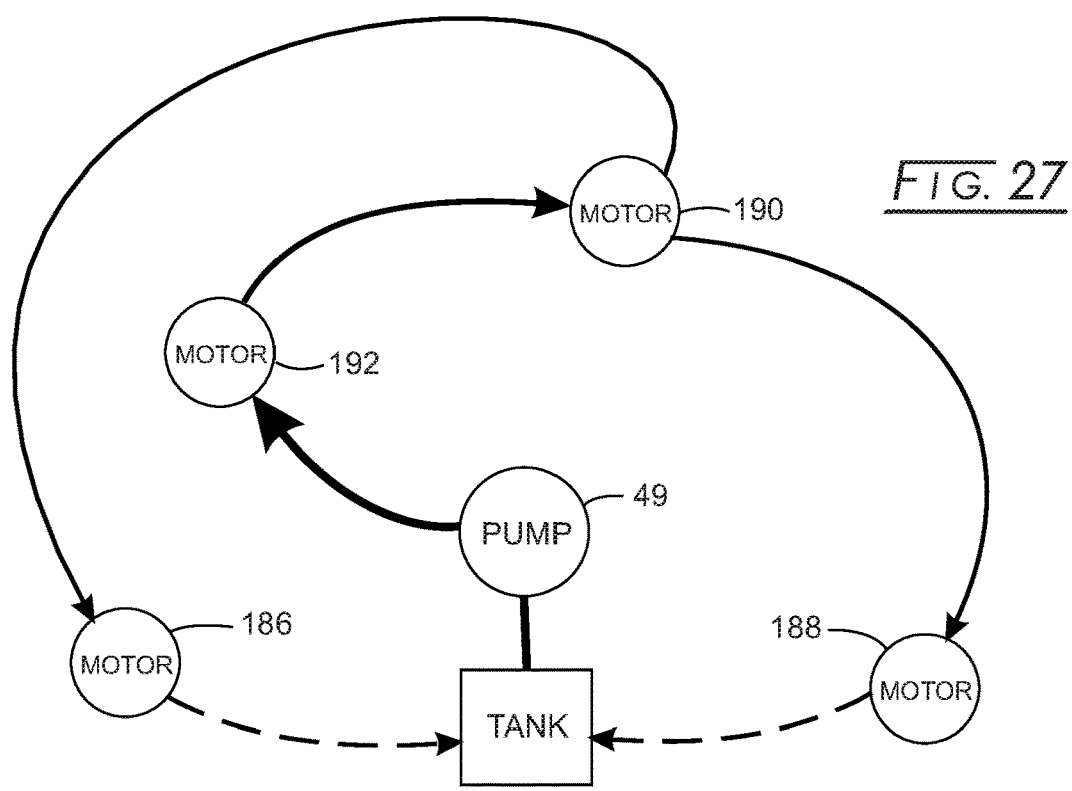

SERIES HYDRAULIC MOTOR SYSTEM FOR DRIVING AIR MOVING FANS ON AN AGRICULTURAL HARVESTING COMBINE

CROSS-REFERENCE TO RELATED APPLICATIONS

This application claims benefit of provisional application 62/591,266 filed Nov. 28, 2017, and is cross-referenced to U.S. applications serial numbers ("USSN") 15/642,799 filed Jul. 6, 2017 (U.S. Publication 2018/0007830), now U.S. Pat. No. 10,383,278; 15/643,685 filed Jul. 7, 2017 (U.S. Publication 2018/0009305), now U.S. Pat. No. 10,257,977; and 15/649,684 filed Jul. 14, 2017, now U.S. Pat. No. 10,045,488, the disclosures of which are expressly incorporated herein by reference.

STATEMENT REGARDING FEDERALLY SPONSORED RESEARCH

Not applicable.

BACKGROUND

The present disclosure relates to harvesting articulated (jointed) combines and more particularly to improved airflow in the forward tractor or crop processing power unit (PPU) (U.S. Ser. No. 15/642,799; U.S. Publication 2018/0007830) having dual engines (U.S. Ser. No. 15/643,685; U.S. Publication 2018/0009305) with all grain stored in a rear grain cart and that permits additional sieve capacity concomitant with tailings return thereto (U.S. Pat. No. 10,045,488).

U.S. Ser. No. 15/642,799 and U.S. Ser. No. 15/649,684 in tandem describe an airflow system involving many components of the harvester that require fan driven airflow through various components of the power system and the separation systems of the machine. Since the movement of the total air system, as it interacts with the separation systems of the machine, is powered by fans that are not physically close to one another, the issue of driving the (4) separate fans is difficult when done by belt or similar drive mechanism. Compound that with the notion that it would be beneficial, if not essential, to the separation process to have all the fans change their speed in unison should the operator or an electronic control system choose to change the speed of the main cleaning fan.

The four fans described in the related patent applications are (a) the main cleaning fan assembly, (b) the charge fan assembly, and (c) a right side tailings fan assembly, and (d) a left side tailings fan assembly. The charge fan assembly sits high up near the top of the chassis, above and behind the operator's cab, and receives air from a cooling fan assembly via the hydraulic cooling radiator. The cleaning fan assembly sits well below the cab and under the feeder mechanism, accepting the air from the charge fan, and accelerating and directing it rearward under and through the cleaning sieves. The two tailings fan assemblies are located on the outward regions of the front chassis, in the protrusion of the chassis that juts outward rear of the front tires, and are used to pull in addition ambient air for blowing up, through, and under the tailings sieves, one on each side of the machine. By illustration, it is seen that driving all these fans is a difficult task, and coordination of the speeds of these fans could be a difficult, complicated, and expensive proposition at best. These tailings assemblies may be referred to herein as bonus assemblies.

However, if one chooses to drive each of these fans by a hydraulic motor, an interesting and opportune arrangement presents itself. All of these motors can be driven on a single series hydraulic circuit, such that the same volume of oil can run through the large, fast cleaning fan, assembly, then to the smaller yet faster charge fan assembly, and then down to the two tailings fan assemblies. Such a hydraulic circuit is possible if the flow can be equally and efficiently separated into two identical volumes of flow when leaving the charge fan assembly. In this manner, a change in the amount of hydraulic flow to the cleaning fan assembly to change its speed and air output volume will necessarily change the speed and subsequent air flow volumes of each of the other fans. Since each of these fan assemblies are in some manner affecting the velocity of air flowing through the separation process that by definition must vary with the related changes of density and air drag of different types of grains being cleaned in the system.

BRIEF SUMMARY

A pump produces variable flow to meet the speed (rpm) requirements of the cleaning fan, while producing sufficient pressure to drive the entire circuit. A motor for the cleaning fan consumes all the output of the pump while reaching the suitable speed range, but only consuming perhaps half of the pressure delivered to it by the pump. In this case we choose a 5.2 $in^3$ motor that can reach up to 1500 rpm—about 30 gal/min flow rate, while using roughly 1600 psi to power the large fan.

A tandem (two equal motors on a common shaft) motor to power the charge fan at roughly 1700 rpm—each motor half being 1.9 $in^3$ displacement and consuming about 14 gal/min at 600 psi pressure drop. The tandem motor has a single flow inlet feeding the two motors that are on a common shaft and thus must turn at equal speeds and equal flow, and then have individual oil exhaust ports; thus, the inflow into the motor(s) is necessarily divided into two exactly equal exhaust flows, while still providing the equivalent power to the charge fan of a single motor using all of the flow.

The two exhaust flows then are directed to one each of the RH and LH tailings fans, and because of the equal split of the flow, the two separate fans are guaranteed to be turning at identical speeds, with identical air outflows to drive identical RH and LH tailing separation systems. In this instance, the motors driving the tailing fans are found to be 2.3 $in^3$ motors turning at about 1350 rpm and thereby consuming about 13 gallons each, and using about 500 psi.

Note at this time that each progressive step is prescribed by design to consume less than the previous stage discharges, which allows that oil that "leaks" from the motor components (inefficiency) is not needed to power the subsequent stages, also that the additive pressure drops thru all the motors (2700 psi) is less than the max pressure that the pump will produce (3000 psi).

Note that the pressures and flow in example are those seen when the cleaning fan is being asked for its maximum air volume production as dictated by a given grain crop parameter as would be typical of, for example, high moisture corn grain. Since the characteristics of a fan dictate that as it slows down (rpm) the amount of power and flow the drive motor needs are also reduced proportionately, so the balance of pressure consumption with decreased flow consumption will remain in balance.

The net will be that the flow output of each fan in series can be controlled correctly by changing the amount of flow that the pump produces, which can be by manual signal, or by automatic signal that sensors on the machine can be enabled to command to the pump.

The important functional factor for this system is the fact or coincidence that the air flow and the power needed to create that flow must line up such that the amount of flow and pressure available to the circuit be sufficient to run all the driven components in a range that serves the functional needs of each system. In this case, the components have been determined such that the parameters are matched to near perfection. The numbers quoted in text above are for this example, and not intended to be specific to the invention.

These and other features will be described in detail below.

BRIEF DESCRIPTION OF THE DRAWINGS

For a fuller understanding of the nature and advantages of the present method and process, reference should be had to the following detailed description taken in connection with the accompanying drawings, in which:

FIG. 23 is an isometric view of the cleaning fan and motor;

FIG. 24 is an isometric view of the charge fan and motor;

FIG. 25 is an isometric view of the right side tailing fan and motor;

FIG. 26 is an isometric view of the left side tailing fan and motor; and

FIG. 27 is a hydraulic diagram of the motors in series;

Figure 1:
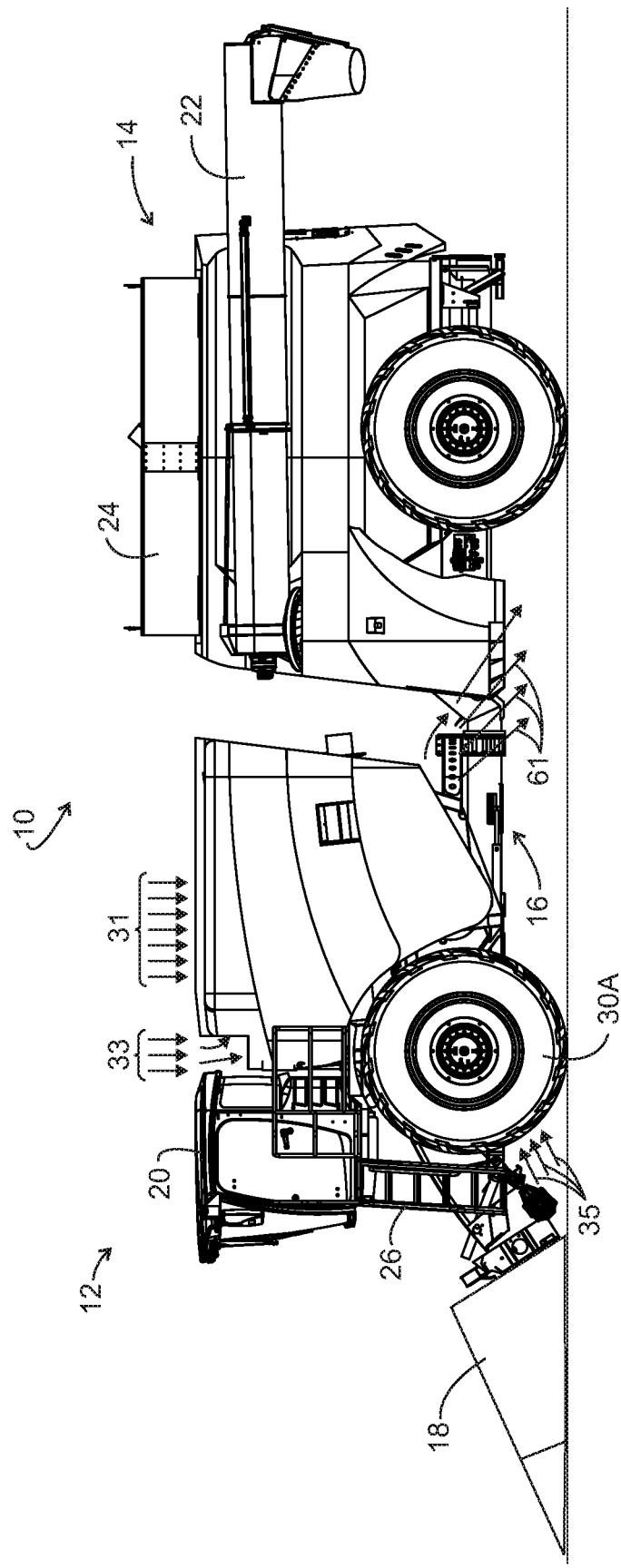
FIG. 1 is a side elevation view of the articulated combine of a forward tractor or crop processing power unit (PPU) and rear grain cart in which the grain is stored.
Figure 2:
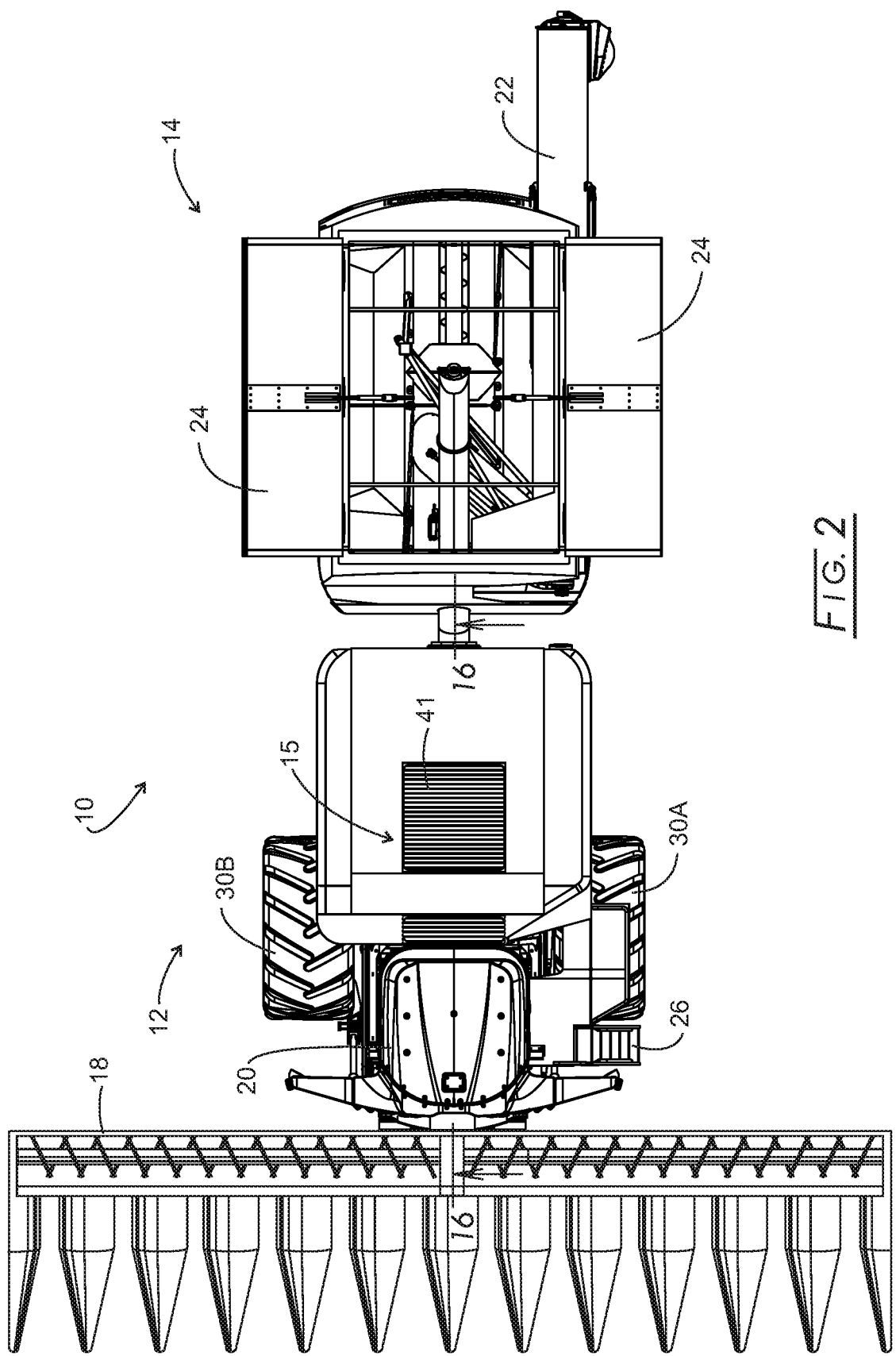
FIG. 2 is an overhead view of the articulated combine of FIG. 1.

The drawings will be described in greater detail below.

DETAILED DESCRIPTION

Harvesting Combine Airflow System

U.S. Ser. No. 15/642,799 broadly discloses a harvesting combine forward unit that carries two axially mounted engines with each undertaking different needed functions. The harvesting combine cooling package is mounted between the dual engines. The cooling package includes a stationary screen, a fan, two independent combustion air coolers (CAC), a radiator that is common to both engines with comingled coolant, a fuel cooler, an AC (air conditioner) condenser, and hydraulic oil cooler. A combustion pre-cleaning "scroll" is attached to the cooling package and is actively powered by screened fan air on the inlet and turbocharger suction on the outlet (via the air filter housing). The cleaning "scroll" separates the dirt from the air using centrifugal force and exhausts the dirt with a portion of the combustion air, resulting in cleaner air entering the filter housing.

A large capacity fan pulls clean air from the top of the combine forward unit and pushes it out through the rear water radiator and out onto the hot exhaust treatment system to keep all surfaces free of chaff/dust; and pushes air out through side-mounted charge air coolers and onto the hot exhaust manifolds of both engines to also keep them chaff free; pushes air out through front hydraulic cooler and forward and down into the cleaning charge air fan (located in a round ring that is in the middle of the hydraulic reservoir) that is forcing air downwardly and through plenums associated with sidesheets and bulkheads that direct the high pressure air downwardly until it reaches the upper rear portion of the cleaning fan, where it comingles with air drawn from in front of the fan. Coincident with the rear plenum bulkhead are louvers that bleed off some of this air and direct it through the wall and rearward along the side of the rotor (concaves) to effectively pre-clean the MOG from the grain shooting through the concaves by the rotor.

Perhaps, 5,000 cubic feet per minute (cfm) of cooling air comingled with about 5,000 to 10,000 cfm of ambient air from above the charge fan are transported down to the cleaning fan, which likely is asking for about 30,000 cfm of air. This design is want to do this because, if we allow the cleaning fan near the ground to pull all 30,000 from in front of the fan, it will likely pull a lot of residue off the ground (inlet vortices sweeping the soil) and plug the undersides of the sieves, which is a deleterious occurrence.

The air from the cleaning fan, then, is propelled rearward and upward, being squeezed by the clean grain conveyor surface, through the main (center, full length) sieves to carry away chaff from the sieves to enhance sieve capacity.

The cooling system for an engine carried by a grain harvesting combine having an internal combustion engine and hot exhaust components, and having a front operator cab includes a generally horizontal fan assembly located atop the harvesting combine for drawing in air; a radiator associated with the engine and through which air flows for engine cooling; a centrifugal scroll pre-cleaner that takes the drawn in air and removes entrained particles to produce a clean exhaust air and a dirty exhaust; and a filter assembly through which the clean exhaust air flows for producing filtered air for admittance into the engine for combustion.

The charge fan assembly is located behind the forward operator cab and draws air from about the top of the PPU and directing a portion of an air flow from the charge fan assembly downwardly into the cleaning fan assembly. The charge fan assembly also directs a portion of airflow along the outside of the rotor and concaves assembly and another portion of airflow down into the cleaning fan assembly. The charge fan assembly also draws away from the operator cab for additional cooling of the forward operator cab.

Referring initially to FIGS. 1, 2, 3, and 4, an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015.

Figure 3:
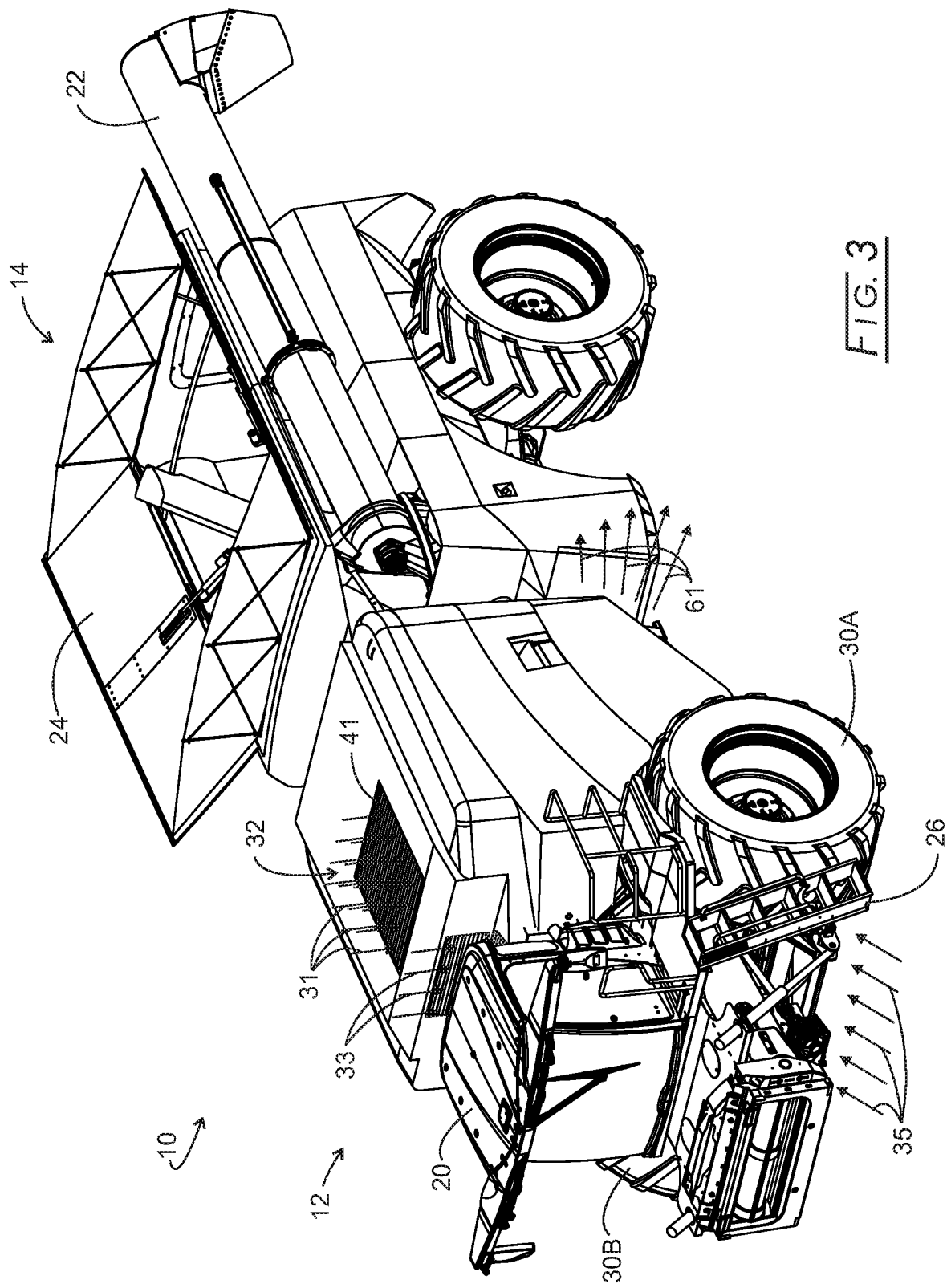
FIG. 3 is an isometric view of the articulated combine of FIG. 1.
Figure 4:
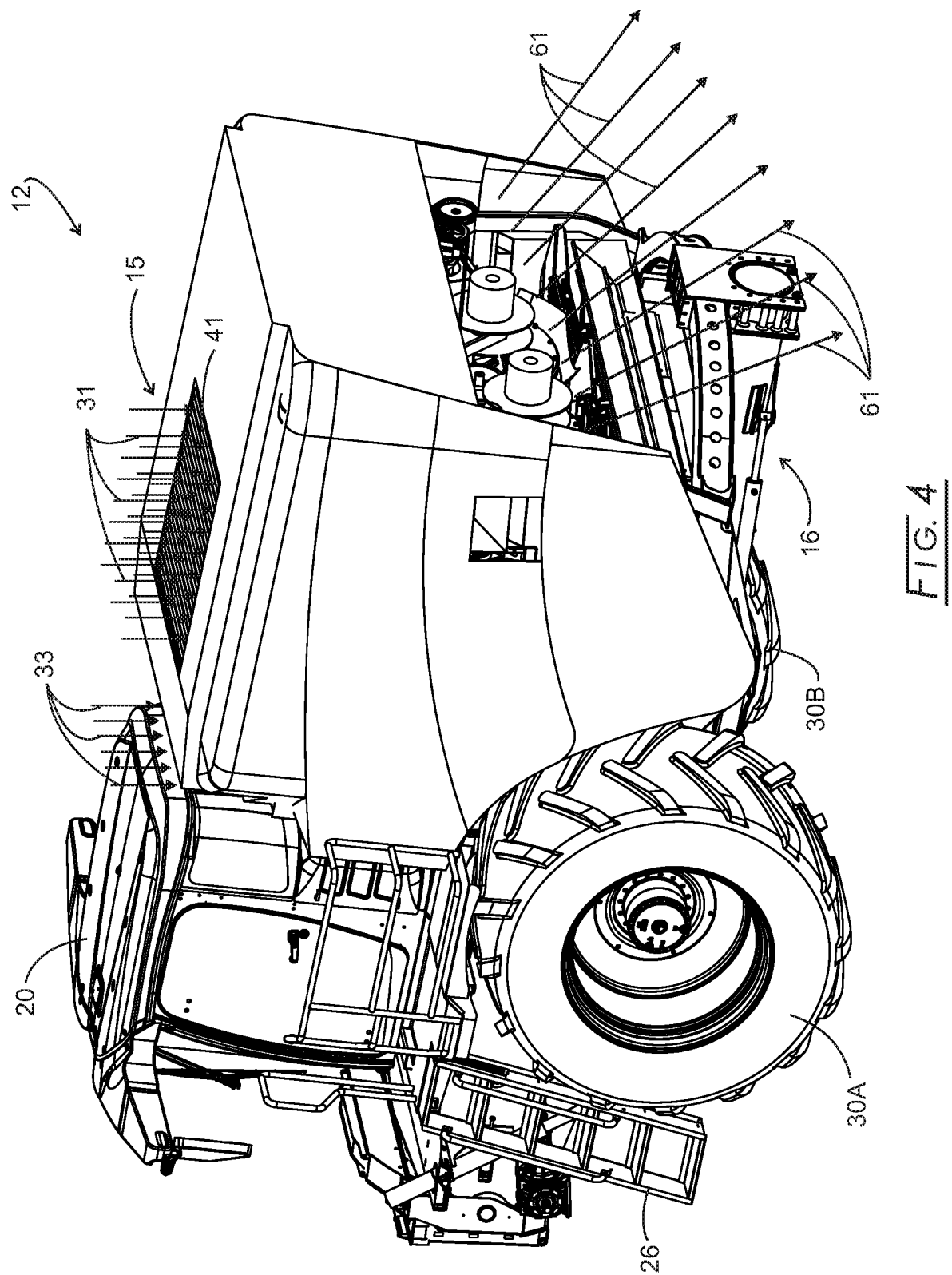
FIG. 4 is an isometric view of the PPU from the right rear side.

Referring now to FIGS. 3 and 4, the operator is granted access to cab 20 by a stair assembly, 26, that extends upwardly from just above the ground and will be more fully disclosed in commonly owned application Ser. No. 62/375,986, filed Aug. 17, 2016.

Of interest for present purposes are the various locations and assemblies for admitting air into PPU 12 for a variety of purposes. Initially, air is admitted into PPU 12 fairly centrally atop PPU 12 as indicated by arrows 31. This location was chosen, as it arguably will be the cleanest flow of air around PPU 12. Various arrows will be used in this description to show the general direction and location of various major air flowpaths into PPU 12, within PPU 12, and exhausted from PPU 12. Additional airflow admittance into PPU 12 is from the top front thereof just behind cab 20, as indicated by arrows 33. A third major airflow path into PPU 12 is at the front bottom thereof between the PPU wheel/assemblies, 30A and 30B, as indicated by arrows 35. Most of the air from within PPU 12 will be exhausted from the rear thereof, as indicated by arrows 61. Fourth airflow paths are inlets at each of the two rear outer corners of cab 20 in front of the side styling panels and below the styling front hood.

Figure 5:
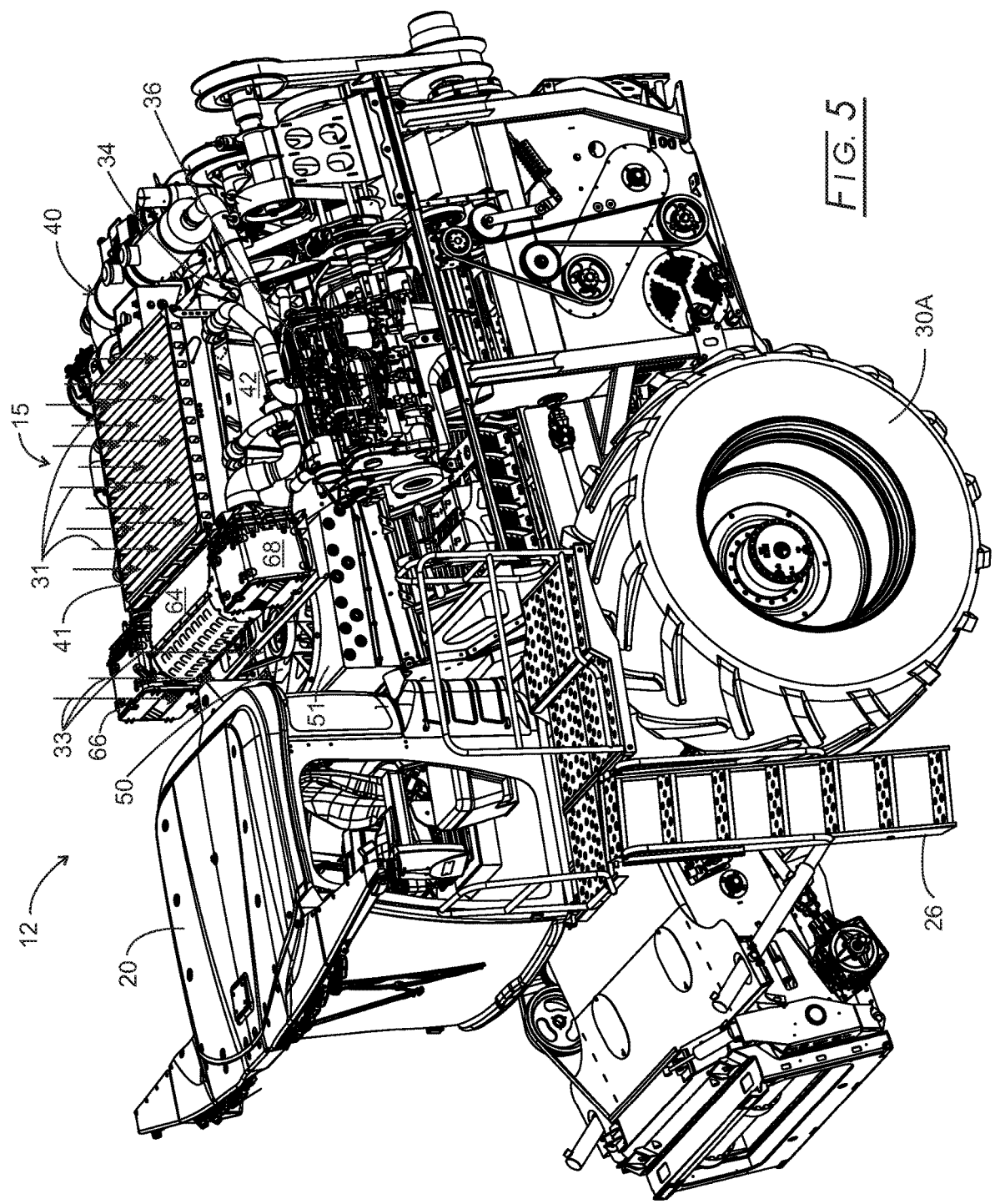
FIG. 5 is an isometric view of the PPU from the right front side with the skin or outer shell removed.
Figure 6:
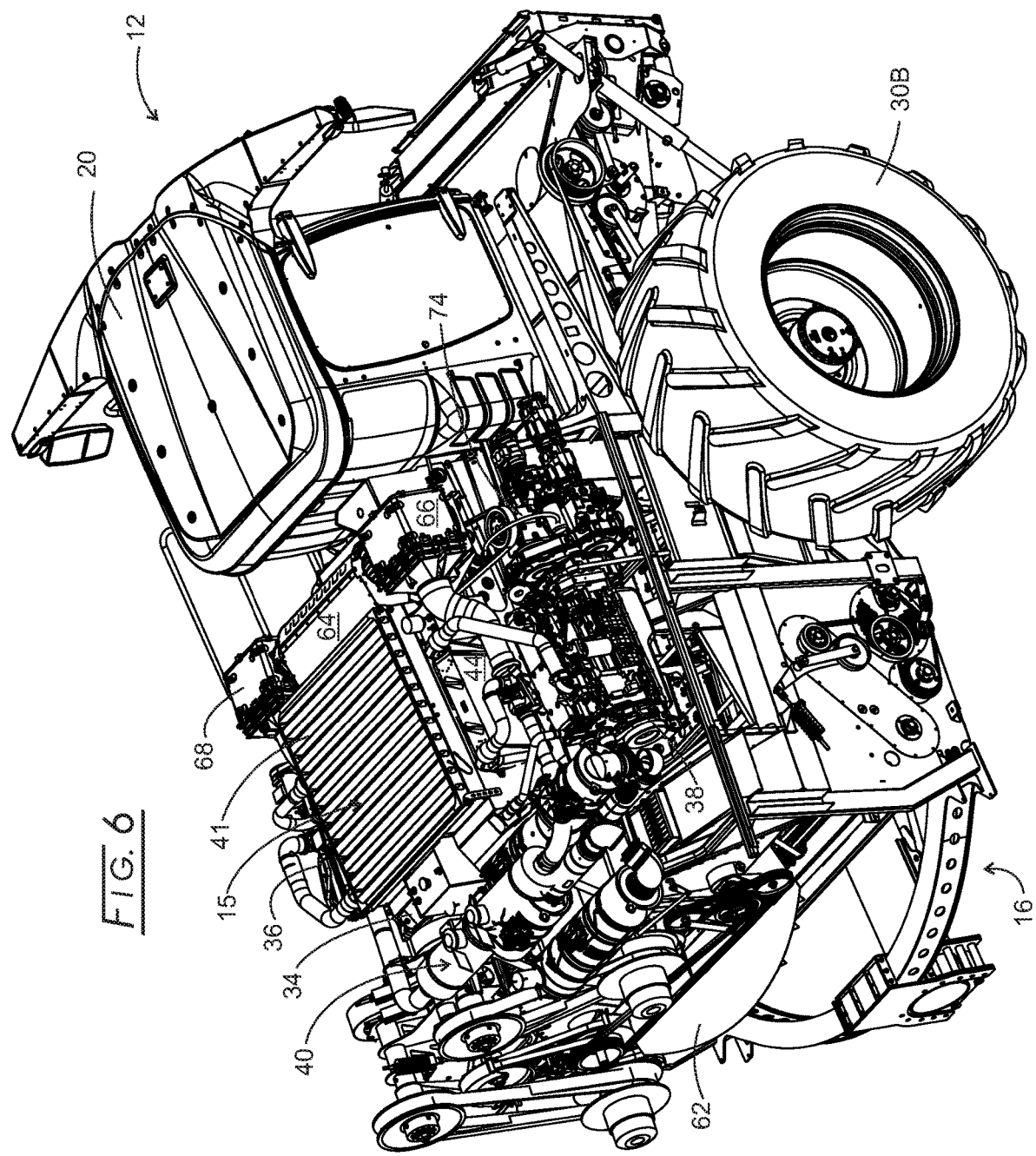
FIG. 6 is an isometric view from above of the PPU from the left rear with the skin or outer shell removed.
Figure 7:
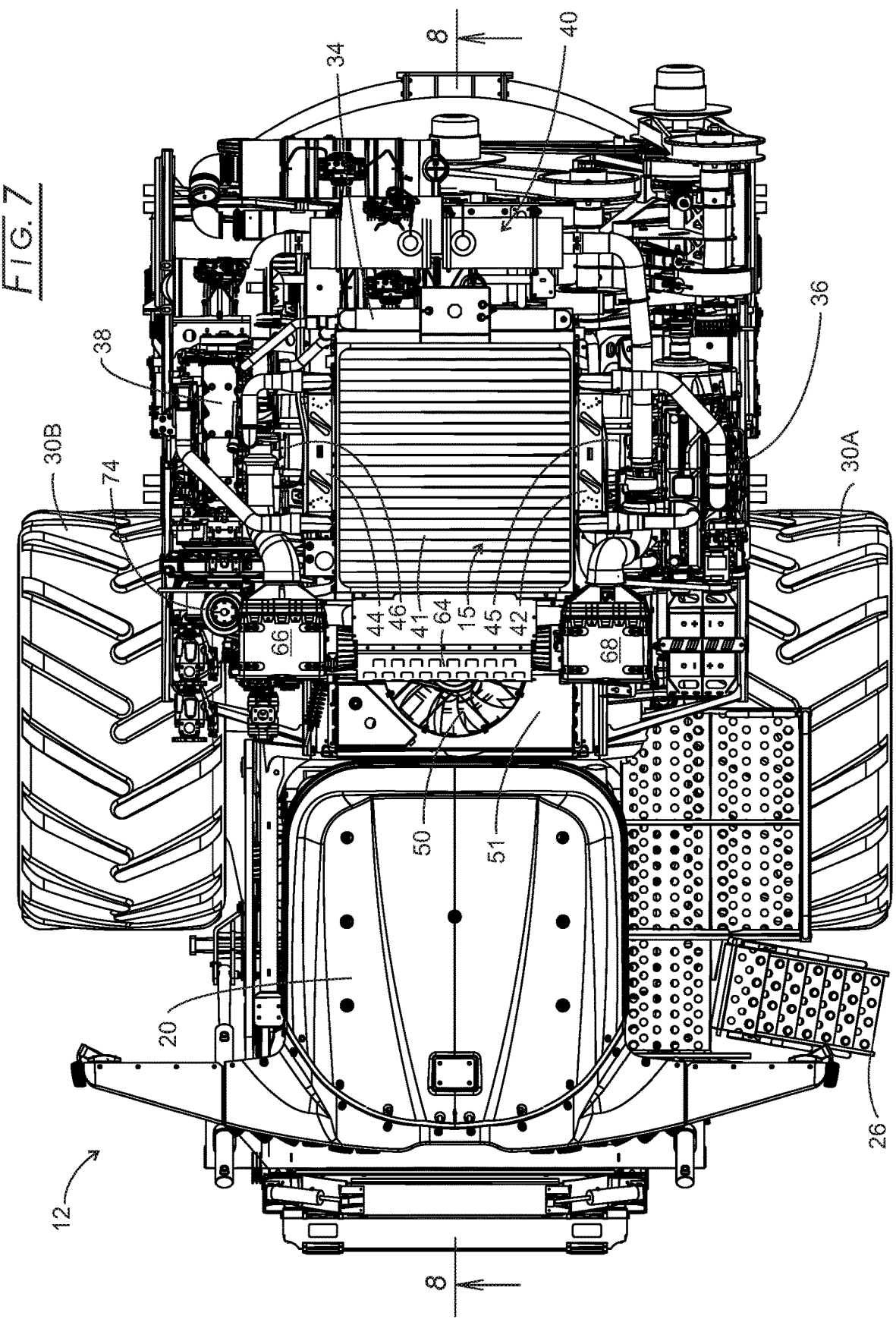
FIG. 7 is an overhead view of the PPU with the skin or outer shell removed.
Figure 8:
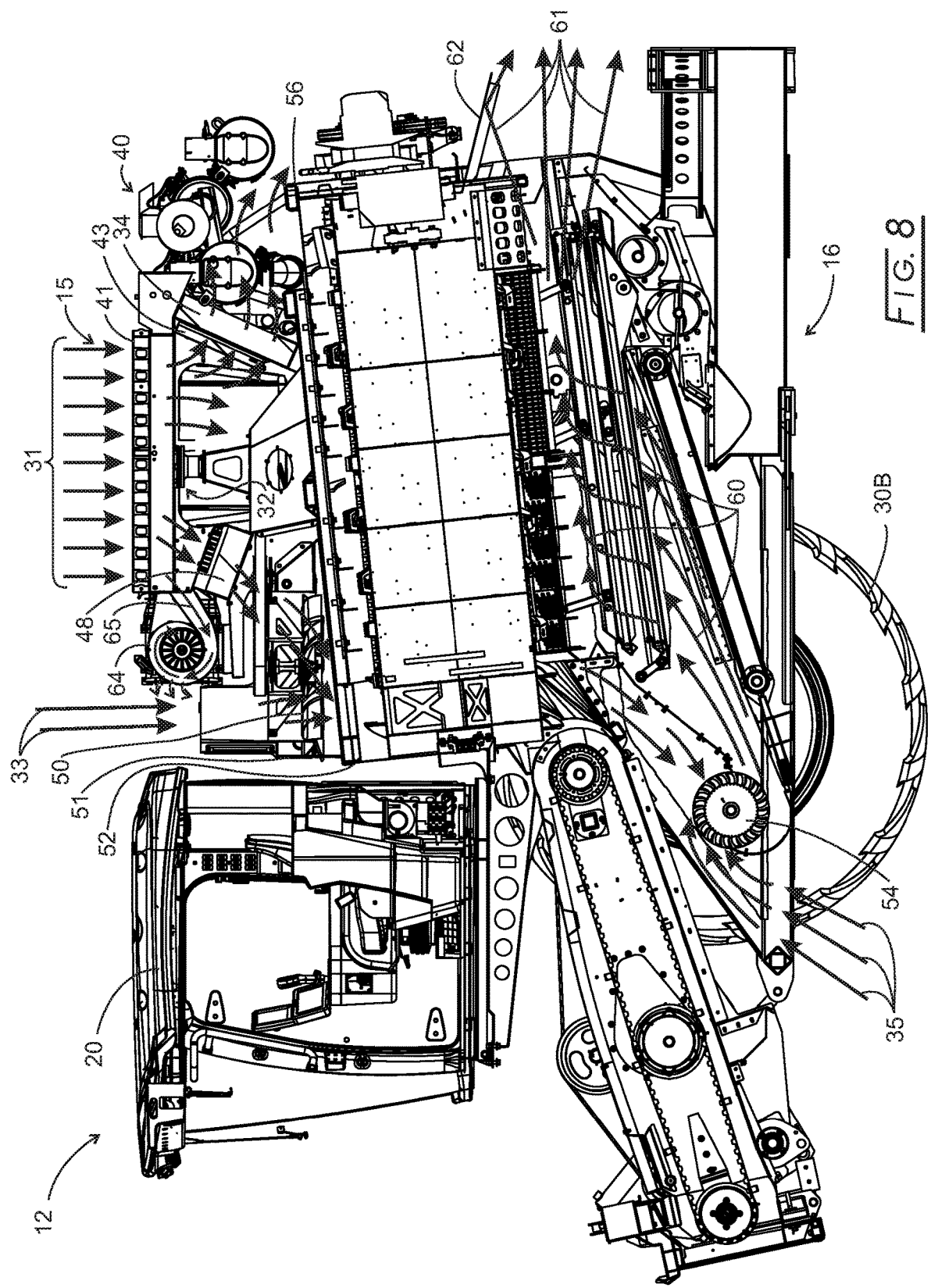
FIG. 8 is a sectional view taken along line 8-8 of FIG. 7.

The skin or shell has been removed in FIGS. 5-7 to reveal components housed within PPU 12. Airflow 31 enters atop PPU 12 through a grate, 41. This location was chosen, as it arguably will be the cleanest flow of air around PPU 12. Radiators, as typified by a radiator, 34 (FIG. 9), surround or cooling fan assembly 32 (FIG. 11) and are coolingly connected with a pair of engines, 36 and 38 (FIGS. 5 and 6, respectively) located on either side of main cooling fan assembly 32. A single air conditioning condenser, 43, sits atop (in front of the air flow) a hydraulic cooler, 48 (FIG. 8), for cooling cab 20. Engine 38 powers the hydraulics and cooling functions/airflow movement for articulated combine 10, while engine 36 powers all other components of articulated combine 10. Exhaust after treatment assembly, 40, cleans air for emission control. When firing up the engines, which typically will be diesel engines (optionally supercharged), engine 38, which is clutched as startup, is started first so that coolant flowing through engine 38 will warm up engine 36 and the hydraulic fluid for articulated combine 10. The twin engines aspect will be described in detail in commonly owned application Ser. No. 15/643,685, filed on even date herewith.

Figure 17:
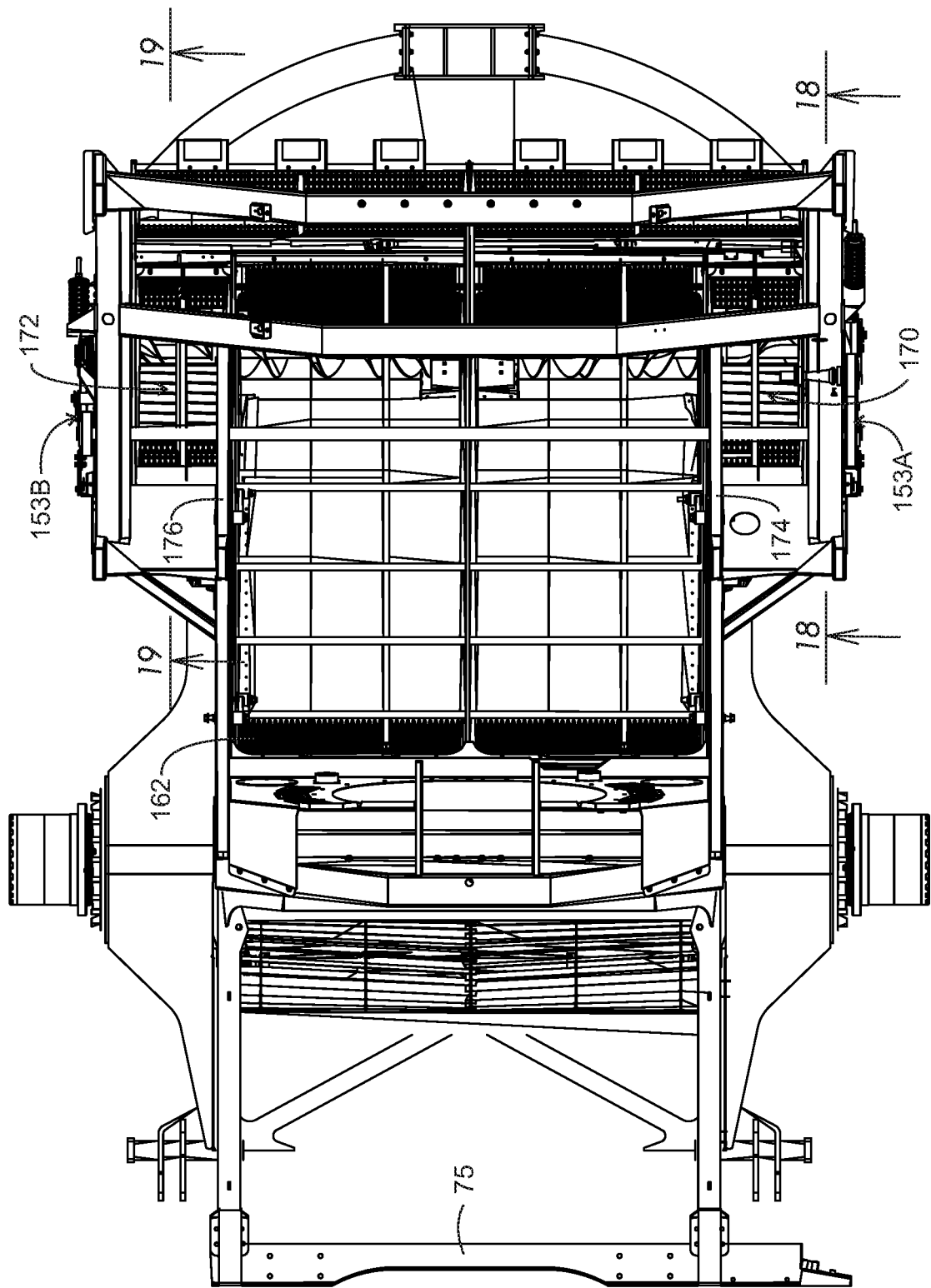
FIG. 17 is a top view of the forward unit of the articulated harvesting combine of FIG. 1 with its internal components removed but for the sieves and bonus sieves assemblies.

Further on the dual engines for combine 10 is illustrated in FIG. 17, which has the cooling system removed. Initially, it will be observed that engine 38 faces forward, while engine 36 faces rearward. Such arrangement ensures that hot exhaust header and turbocharger face inwardly for both engines and adjacent the incoming top airflow and centrally located cooling assembly. Engine 38 is seen driving a variety of shafts, pulleys, and belts, which are attached to and drive hydraulic pumps, such as, for example, hydraulic pump, that drive the hydraulically driven systems of combine 10, as described herein and in the related applications cited herein. On occasion, the load on engine 38 will reach the capacity of engine 38, while the load on engine 36 is below its capacity, such as, for example, during unloading of grain from grain cart 14. Accordingly, a hydraulic line, 37, typically a 1" line, runs from a pair of hydraulic pump, 47, and driven by engine 38, to a pair of hydraulic pump, 49, driven by engine 36. Hydraulic pump 49 will add to the capacity of the hydraulics driven by engine 38 during times that such extra capacity is needed.

Figure 9:
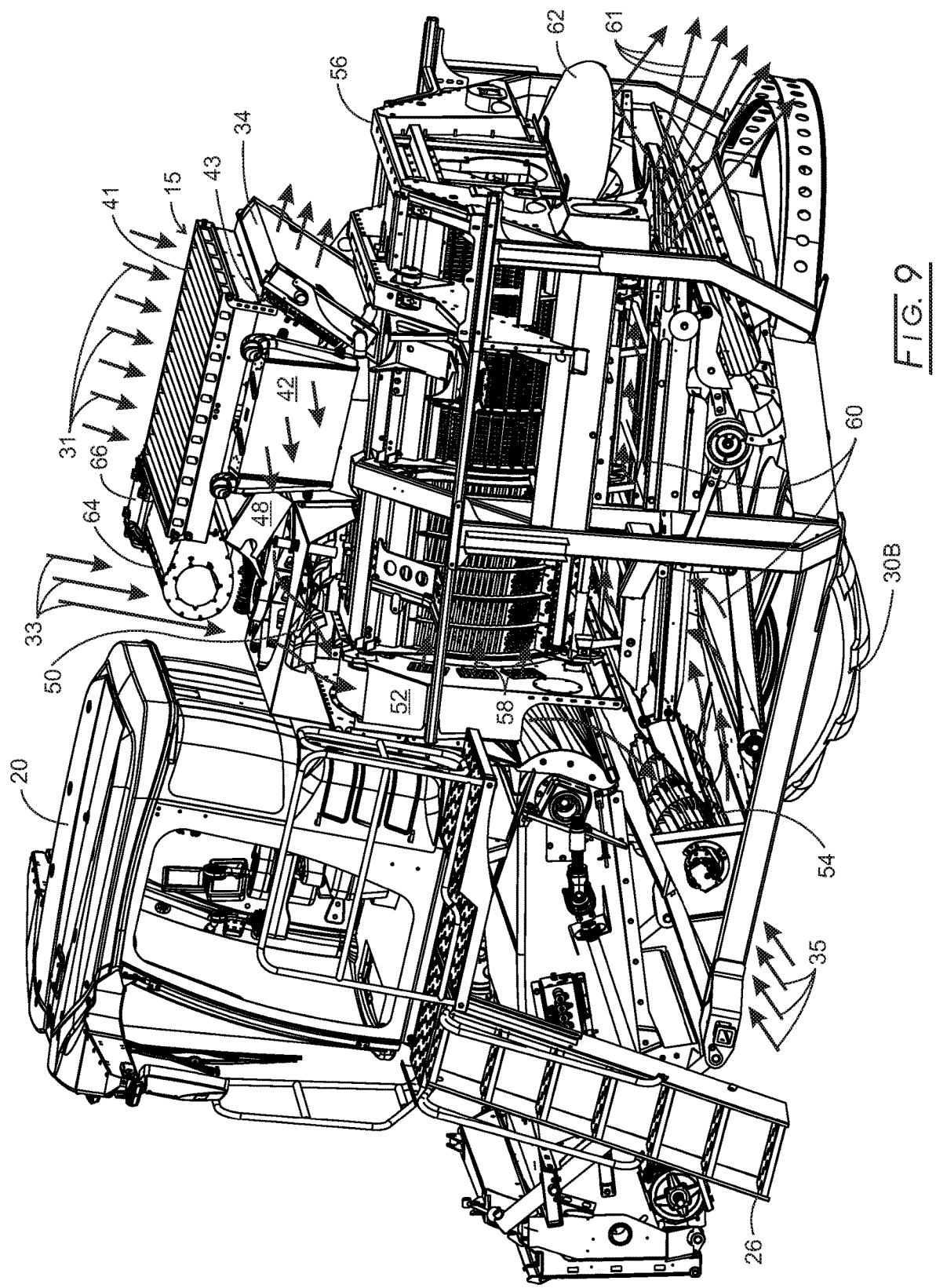
FIG. 9 is a right side isometric view of the PPU with the skin and left wheel/tire assembly removed.

Large capacity (cooling) fan assembly 32 (FIG. 11) that pulls clean air 31 from the top of PPU 12, pushes the air out through a rear water radiator 34 (FIG. 9), and out onto a hot exhaust treatment system, 40 (FIG. 5) to keep all surfaces free of chaff/dust and for cooling purposes; and pushes air out through side-mounted charge air coolers, 42 and 44 (FIGS. 5, 6 and 7, respectively) and onto the hot exhaust manifolds, 45 and 46 (FIG. 7, respectively) of both engines to also keep them chaff free; pushes air out through front hydraulic cooler 48 (FIG. 8) and forward and down into the cleaning charge air fan, 50 (located in a round ring that is in the middle of the hydraulic reservoir, 51, FIG. 9) that is forcing air downwardly and through plenums associated with sidesheets surrounding the concaves (see FIG. 21) and a forward bulkhead, 52 (FIGS. 9 and 10) that direct the high pressure air downwardly until it reaches the upper rear portion of a cleaning fan assembly, 54 (FIGS. 8 and 9), where it comingles with air 35 drawn from in front of fan assembly 54. Coincident with a rear plenum bulkhead, 56 (FIGS. 8 and 9), are forward bulkhead 52 louvers (FIGS. 9 and 10) that bleed off some of this air, 58 (arrows in FIGS. 9 and 10), and direct it through the wall and rearward along the side of the rotor (concaves) to effectively pre-clean the MOG from the grain shooting through the concaves by the rotor. Fan blades of fan assembly 32 can be rotated, reversing the air flow, cleaning the radiation 34, condenser 43, coolers 42 and 44, and oil cooler 48, of debris.

Perhaps, about 5,000 to 10,000 cfm of cooling air comingled with about 5,000 to 10,000 cfm of ambient air from above charge fan 50 are transported down to cleaning fan assembly 54, which likely is asking for about 30,000 cfm of air. This design is want to do this because, if we allow cleaning fan assembly 54 near the ground to pull all 30,000 from in front of fan assembly 54, it will likely pull a lot of residue off the ground (inlet vortices sweeping the soil) and plug the undersides of the sieves, which is a deleterious occurrence.

The air from cleaning fan assembly 54, then, is propelled rearward and upward (see arrows 60 in FIGS. 8 and 10), being squeezed by the clean grain conveyor surface, through the main (center, full length) sieves to carry away chaff from the sieves to enhance sieve capacity. This air will track mostly straight rearward and will not comingle with the bonus sieve air.

Figure 15:
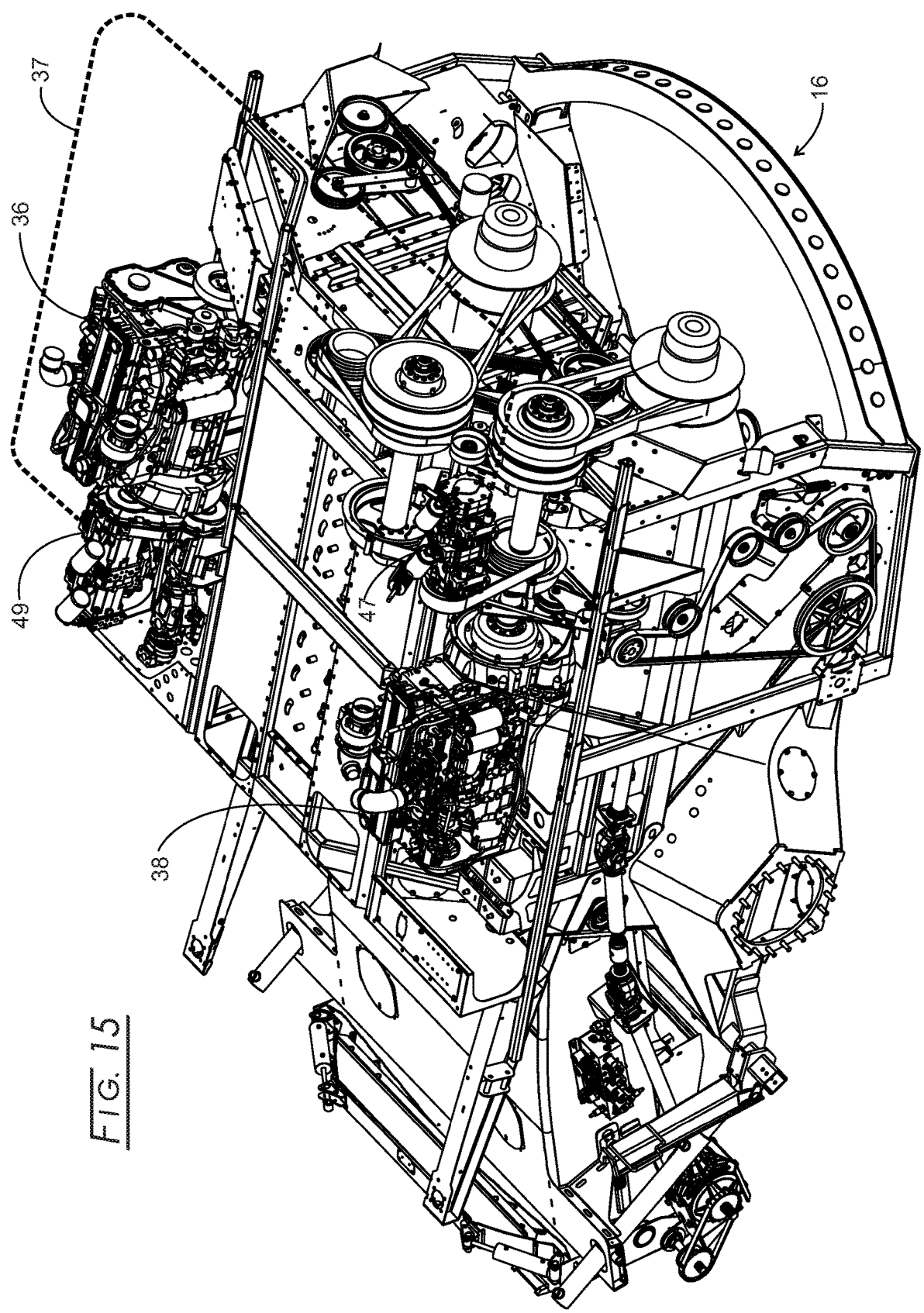
FIG. 15 is an isometric view of the dual engines with the screened air inlet and cooling assembly removed to better see the dual engines.
Figure 16:
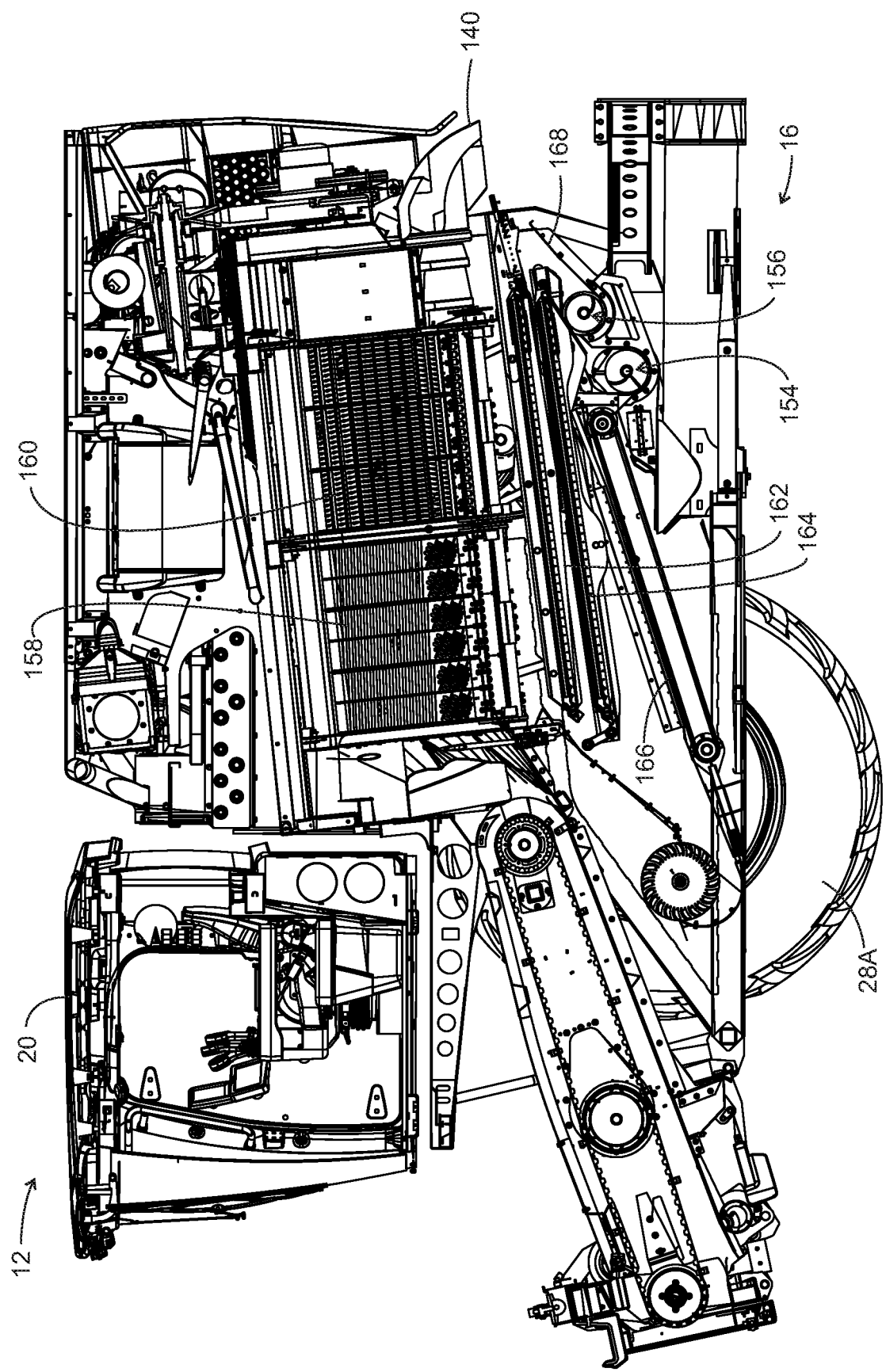
FIG. 16 is a sectional view taken along line 16-16 of FIG. 2.

Cleaning fan assembly 54 also is shown in further detail in FIGS. 15 and 16. In particular, elongate "squirrel cage" fan, 55, is carried by a cleaning fan housing, 57. An air guide vane, 59, is located rewardly thereof and has a pair of spaced apart, angled guide vanes, 63A and 63B, on its top surface and a pair of angled, spaced apart guide vanes, 71A and 71B. Elongate fan 55 tends to exhaust most of its air in its central portion with a low amount of air at its ends. The deflector plates direct an amount of air to the ends of clean fan assembly 54 to even out the air flow along its widthwise extent. Deflector plate 59 is adjustable, as air the deflector plates.

Figure 10:
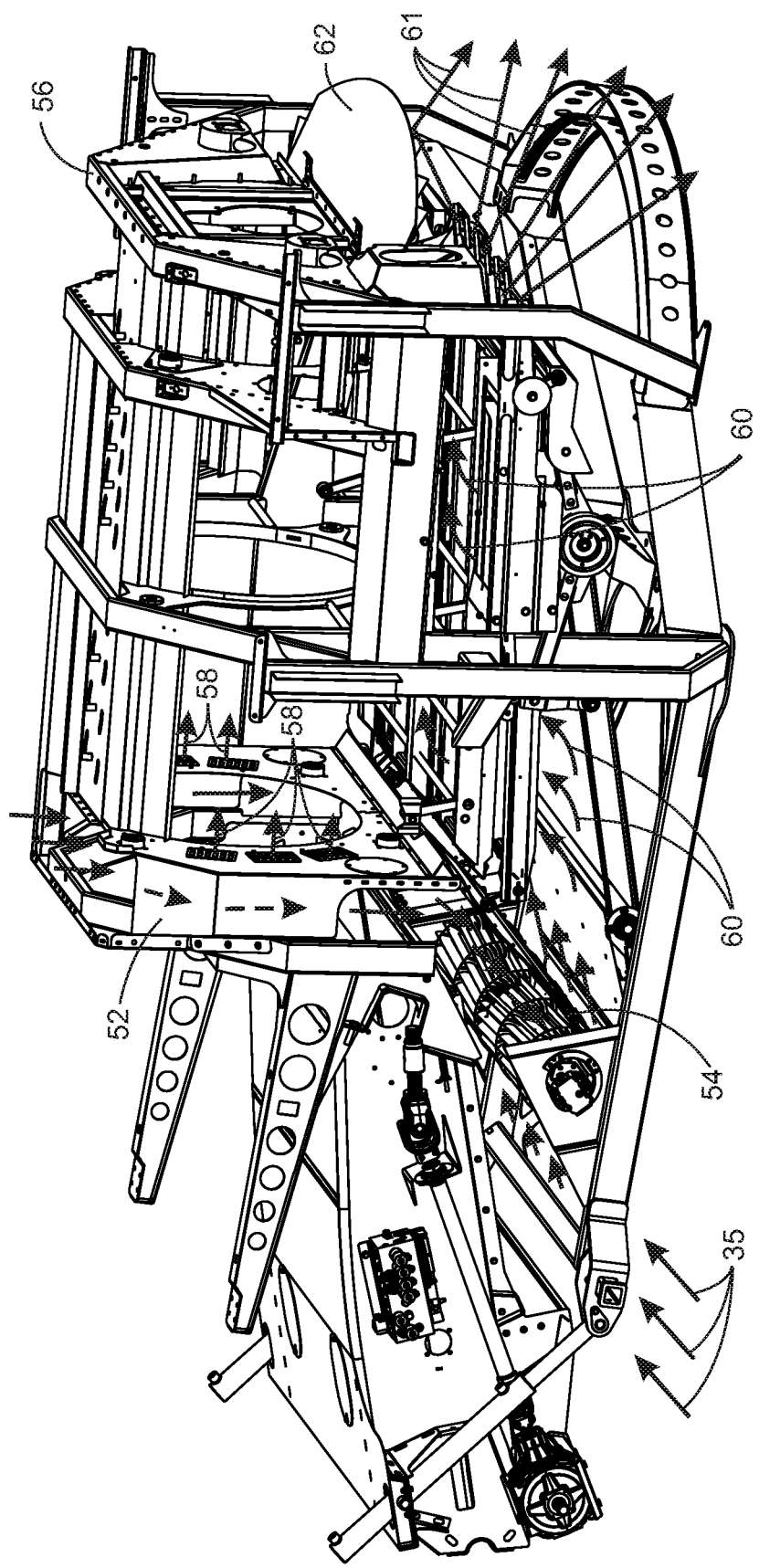
FIG. 10 is an isometric view of the chassis and frame assembly of the PPU.

FIG. 10 shows the chassis and frame assembly of PPU 12 along with various of the airflows described above. Also, note that an air deflector shield, 62, is located above exhaust air flow 61 at the rear of PPU 12 so that such dirty air does not rise above PPU 12 for re-admission thereinto. A description of the concaves and grates, and the chassis also can be found in commonly-owned application Ser. No. 14/967,691, filed Dec. 14, 2015.

Figure 11:
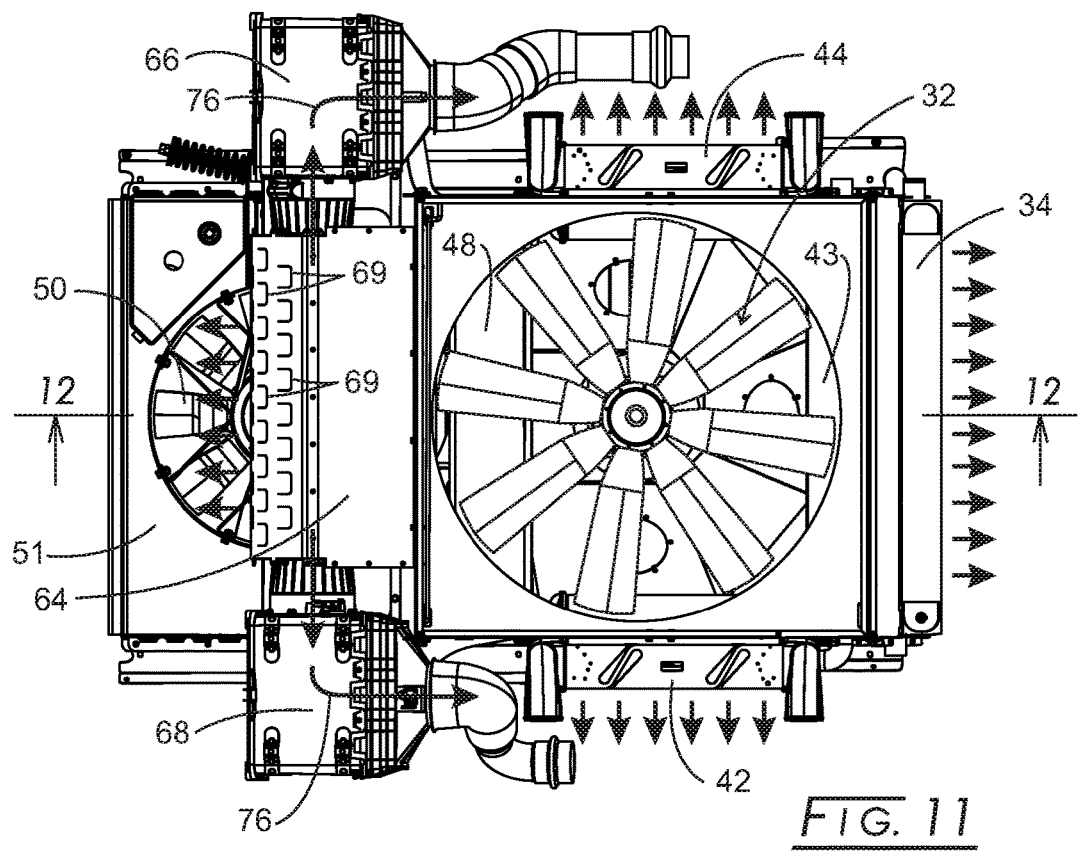
FIG. 11 is a top view of the PPU cooling package, including a stationary screen, a fan, two independent combustion air coolers (CAC), a radiator that is common to both engines with comingled coolant, a fuel cooler, an AC (air conditioner) condenser, and hydraulic oil cooler.
Figure 12:
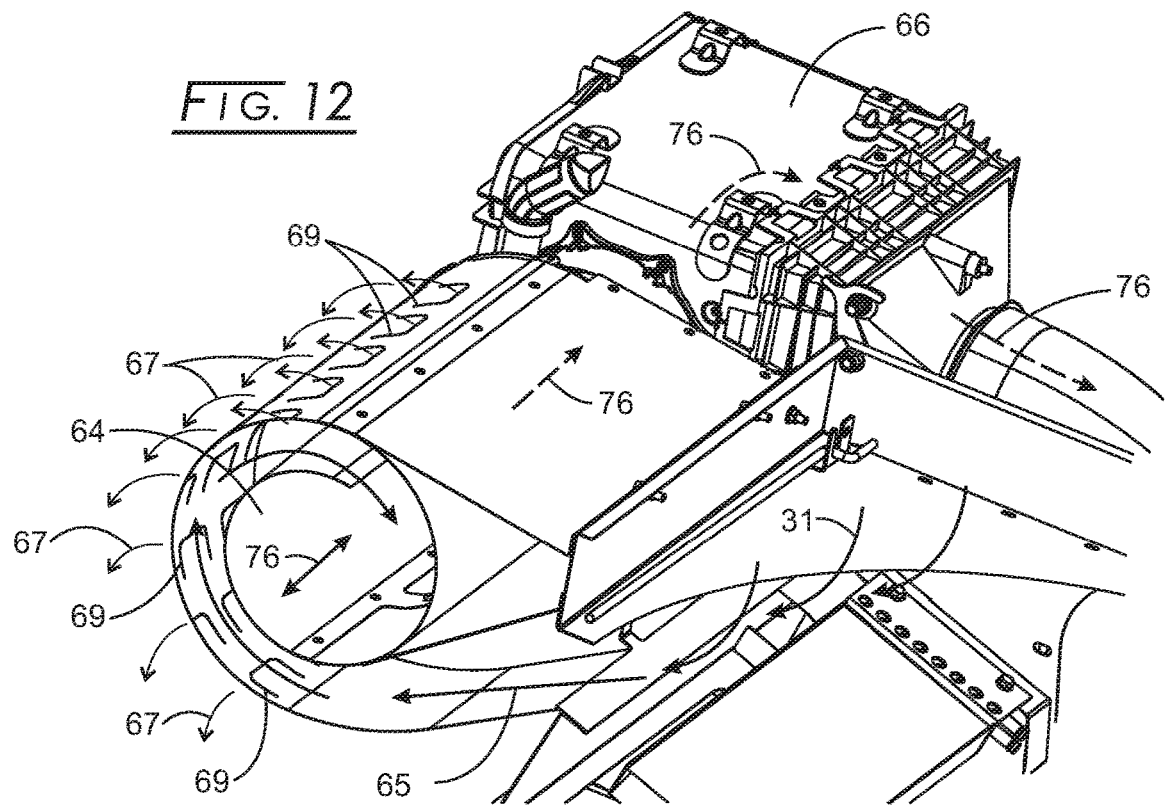
FIG. 12 is an isometric view of the combustion pre-cleaning "scroll" that separates the dirt from the air using centrifugal force and exhausts the dirt with a portion of the combustion air, resulting in cleaner air entering the filter housing.
Figure 13:
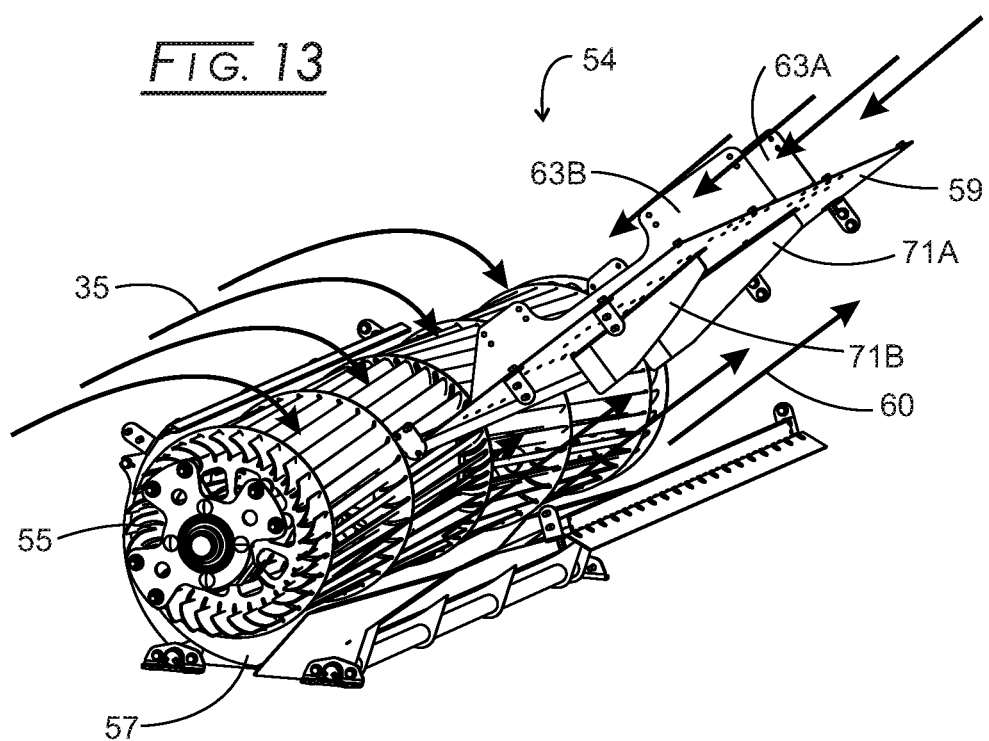
FIG. 13 is an isometric view of cleaning fan assembly.
Figure 14:
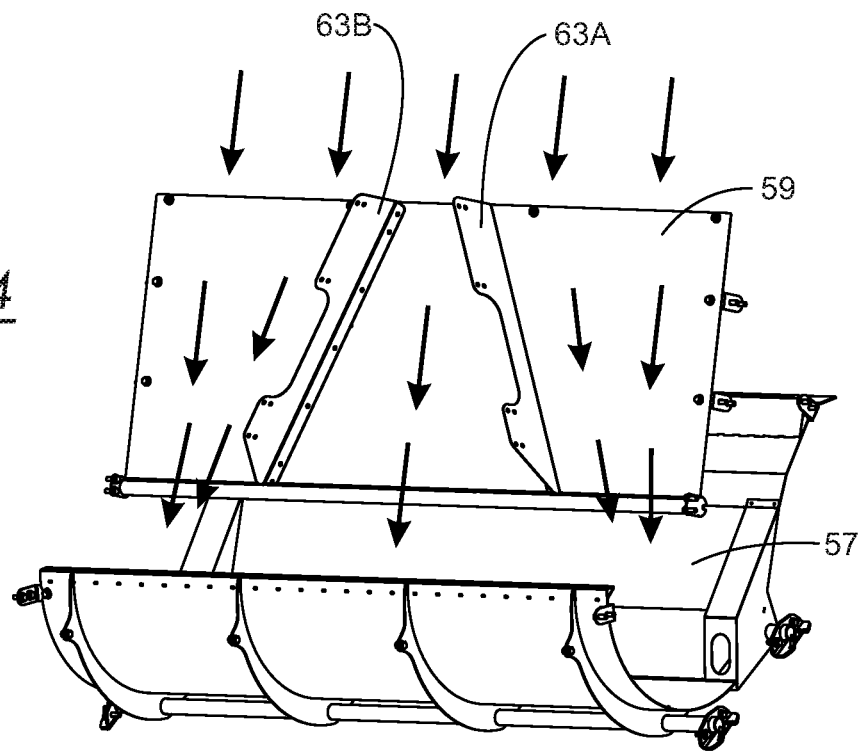
FIG. 14 is an isometric view of the cleaning fan assembly of FIG. 15 with the rotating fan itself removed to see the guide vanes on the divider plate.

Main fan assembly 32 is shown also in FIG. 11, along with cleaning charge air fan 50. A cleaning "scroll" chamber, 64, separates dirt from air 65. Air 65 from fan assembly 32 enters scroll chamber 64 using centrifugal force and exhausts the dirt with a portion of the combustion air, resulting in cleaner air entering filter housings, 66 and 68, from which filtered air 76 is sent to the turbochargers for the engines.

Bonus Sieves System

U.S. Pat. No. 10,045,488 broadly discloses bonus sieves assemblies that are located in the outer rear of the PPU for accepting grain from concaves and grates assemblies located forward of the bonus sieves assemblies. The bonus sieves assemblies accept tailings from the concaves and grates assemblies for additional separation of grain from material other than grain (MOG). New and separate airflow is provided for the bonus sieves. The bonus sieves tailings are returned to the bonus sieves for re-threshing, optionally after being particulated and air separation performed.

Such improved sieve type cleaning system has increased functional area from its primary area commencing between the forward tires of the harvester to a wider width for the region behind said tires, continuing to near or beyond the effective rear of the separation and cleaning area of the harvester being the harvester traditional or articulated. The extra threshing assemblies are structurally suspended for the wider sieve sections from the support structures of the major sieves in a manner that does not require these extra threshing sieves to be driven separately from the major sieves. Both upper and lower bonus sieves could be "co-shaken" versus the opposing shake of the major sieves assemblies. Alternatively, the bonus sieves could be shaken in opposition to each other and the major sieves, given proper structural allowances. The bonus sieve arrangement could be chosen to use only one layer of sieve, be it the bottom or top sieve only when suitable crop performance can be reached.

Dedicated fan assemblies are located apart from the major cleaning fan that are solely dedicated to providing air volume for the winnowing functions of the (wider) extended rear sections of sieves. Bonus sieves could conceivably be driven by air from the primary fan, given proper ducting and given recognition of the extra air volume that the primary fan would have to provide.

The return of the tailings material via the dual return elevators to the front of the bonus sections of the sieve component, and introduced in such a manner as to have a portion of the air from the bonus fans being used to remove lighter MOG from the material stream such that it does not fall onto the surface of the sieve(s). The tailings material could be discharged into the airflow such that such tailings are splayed out into the air stream for a particulate material flow and are, thusly, particulately separated such that the air can act upon each particle of grain or MOG independently. The splaying of the tailings material could be assisted by velocity imparted by centrifugal force from the return elevator assembly and centrifugal force.

The location of the bonus sieves (not necessarily) adjacent to (directly beside while below) the separation area (commonly "separation grates") of a rotary separator so as to significantly increase the relative area of cleaning sieve in the section of the separator where increased MOG versus grain ratio can be expected, and as such prevent the unfortunate introduction of excess MOG onto the stratified flow in existence on the main sieves in this rearward section of the cleaning system.

In FIG. 16, concaves, 158, and grates, 160, are seen housed within PPU 12. Below the concaves and grates are a pair of stacked, shaken sieves assemblies, 162 and 164, where an air fluidized, grain-rich mat, is shaken with heavier grain falling downwardly and lighter MOG carried away by the fluidizing air flow, all in conventional fashion. The heavier grain falls down through the two sieves assemblies down onto a conveyor, 166, for movement rearwardly and downwardly to be transferred to rear grain cart 14. A wall, 168, catches heavier tailing material that is blown from the sieves assemblies and directs the heavier tailings down to the tailing auger assembly 156. The remaining MOG is blown out the rear of PPU 12 and directed downwardly by hood 140.

Bonus sieves assemblies, 170 and 172, can be seen in FIG. 17 and are hung rails, 174 and 176, which also support upper sieves assembly 162 resulting in bonus sieves assemblies 170 and 172 being oscillated or shaken in concert with upper sieves assembly 162. The extra width of PPU 12 will be appreciated in FIG. 17 and, as stated above, results from the absence of rear (steering) wheels for PPU 12 by virtue of the articulated design. In FIG. 17 and other figures, much of the bonus sieves have not been completely shown so as not to have too much blackened area. The ends of the sieves typically are shown as "sieves", however.

Figure 18:
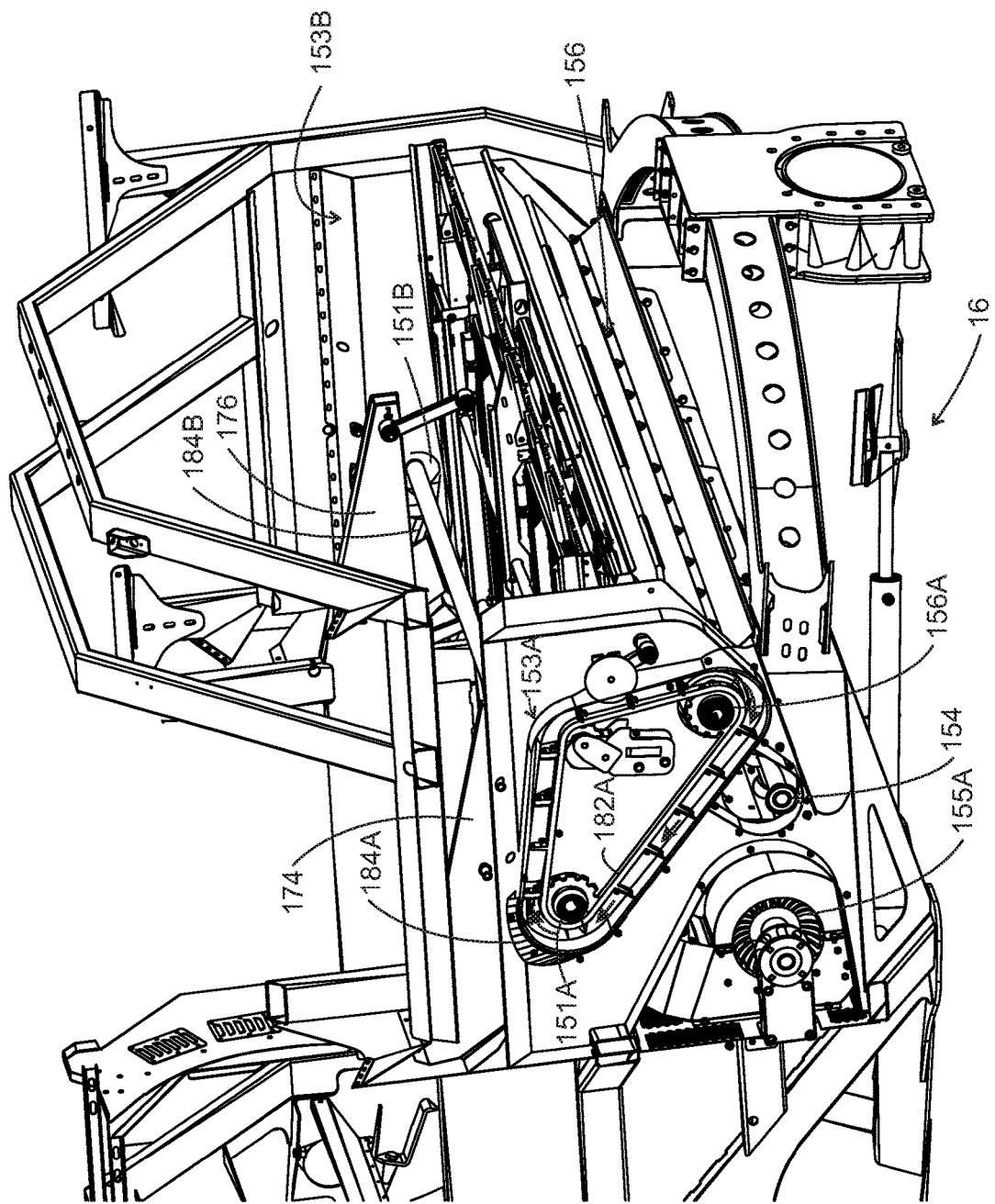
FIG. 18 is a section view taken along line 18-18 of FIG. 11.

FIG. 17 also reveals conveyor assemblies 153A and 153B for the bonus sieves assemblies 170 and 172. FIG. 18 reveals further details for bonus sieves assembly 153A, as described below. Some of the components for bonus sieves assembly 153B, located on the opposite side of articulated harvester 10, are not shown in the drawings, but the same as will be described below in connection with bonus sieves assembly 153A. Referring again to FIG. 18, revealed are a fan assembly 155A, tailing auger assembly 156, and grain auger drive assembly 154. Tailing grain auger assembly 156 is driven by sprockets, 156A and 156B. The return tailings are fed to the bonus sieves conveyors 153A and 153B by tailing auger assembly 156 through openings next to sprockets 151A and 151B. The tailings, then, are conveyed upwardly by conveyor chain paddle assemblies, 182A and 182B, to openings, 184A and 184B, behind sprockets 151A and 151B. Openings 184A and 184B are shaped so that the tailings are directed onto bonus sieves 170 and 172, respectively.

Figure 19:
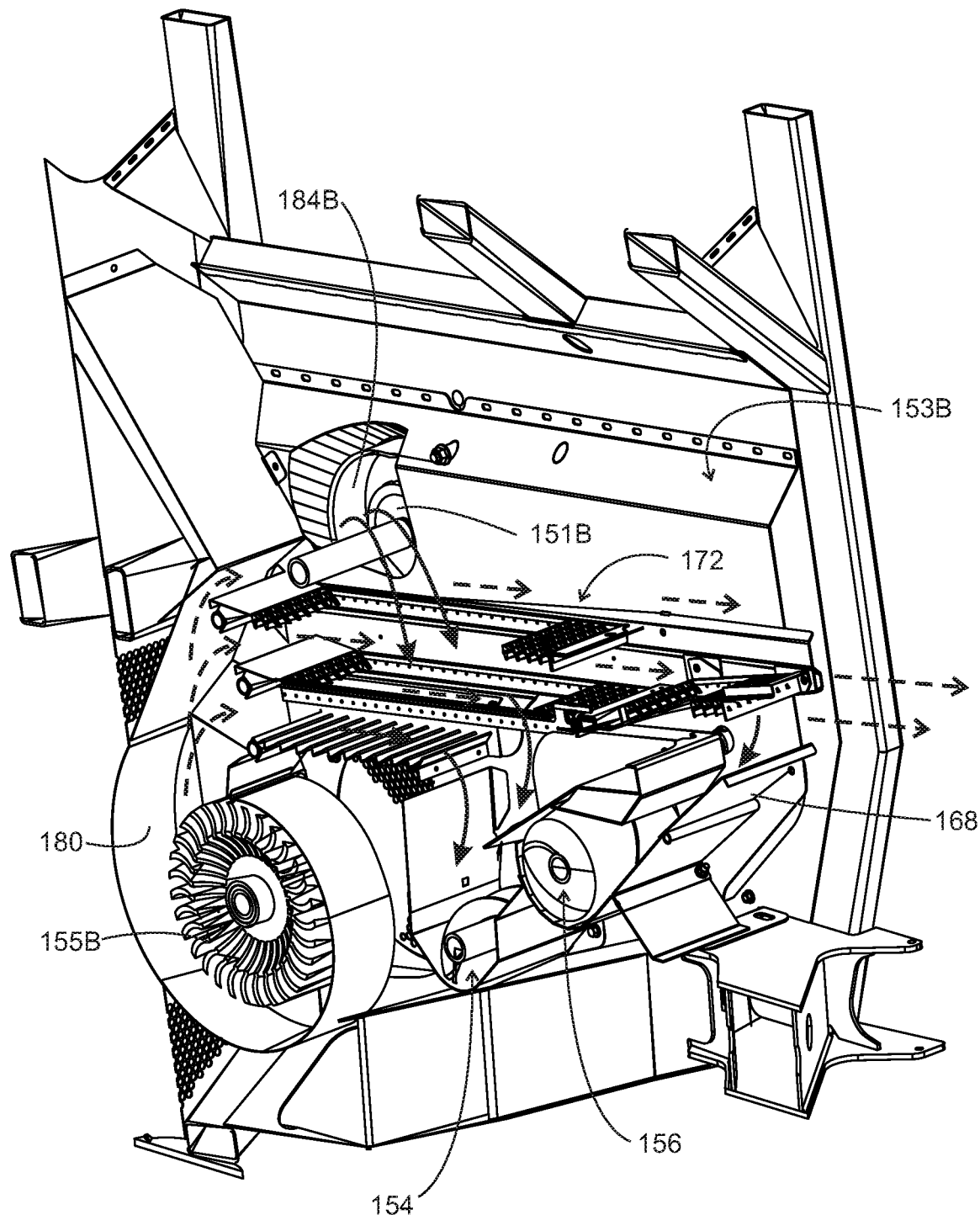
FIG. 19 is a section view taken along line 19-19 of FIG. 12.

Fan assembly 155B is revealed in further detail in FIG. 19. It will be seen to include a curvilinear director assembly, 180, that directs an airflow (dotted arrows being airflow in FIG. 19, while solid arrows shows material flow) towards the bonus sieves assemblies for removal of lighter MOG material while letting heavier grain fall down through the bonus sieves 170 and 172 and into auger assembly 154. It will be observed that material (tailings from concaves 158 and grates 160) from grain auger drive conveyor assemblies 153A and 153B moves downwardly onto bonus sieves assembly 172 for additional grain recovery with separated grain falling into auger assembly 154.

Figure 20:
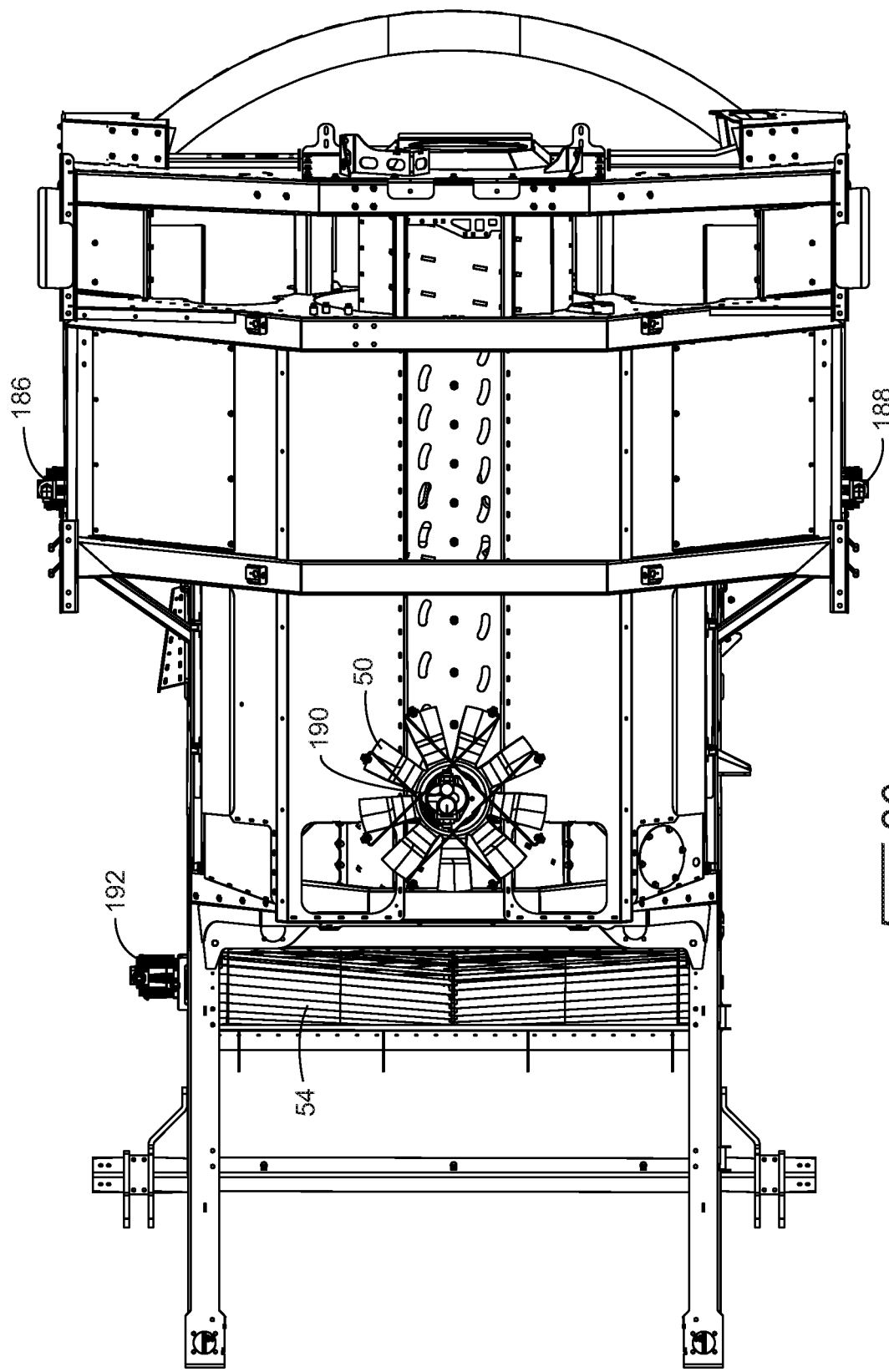
FIG. 20 is a simplified top view of the chassis showing the motors to be hooked in a single hydraulic circuit.
Figure 21:
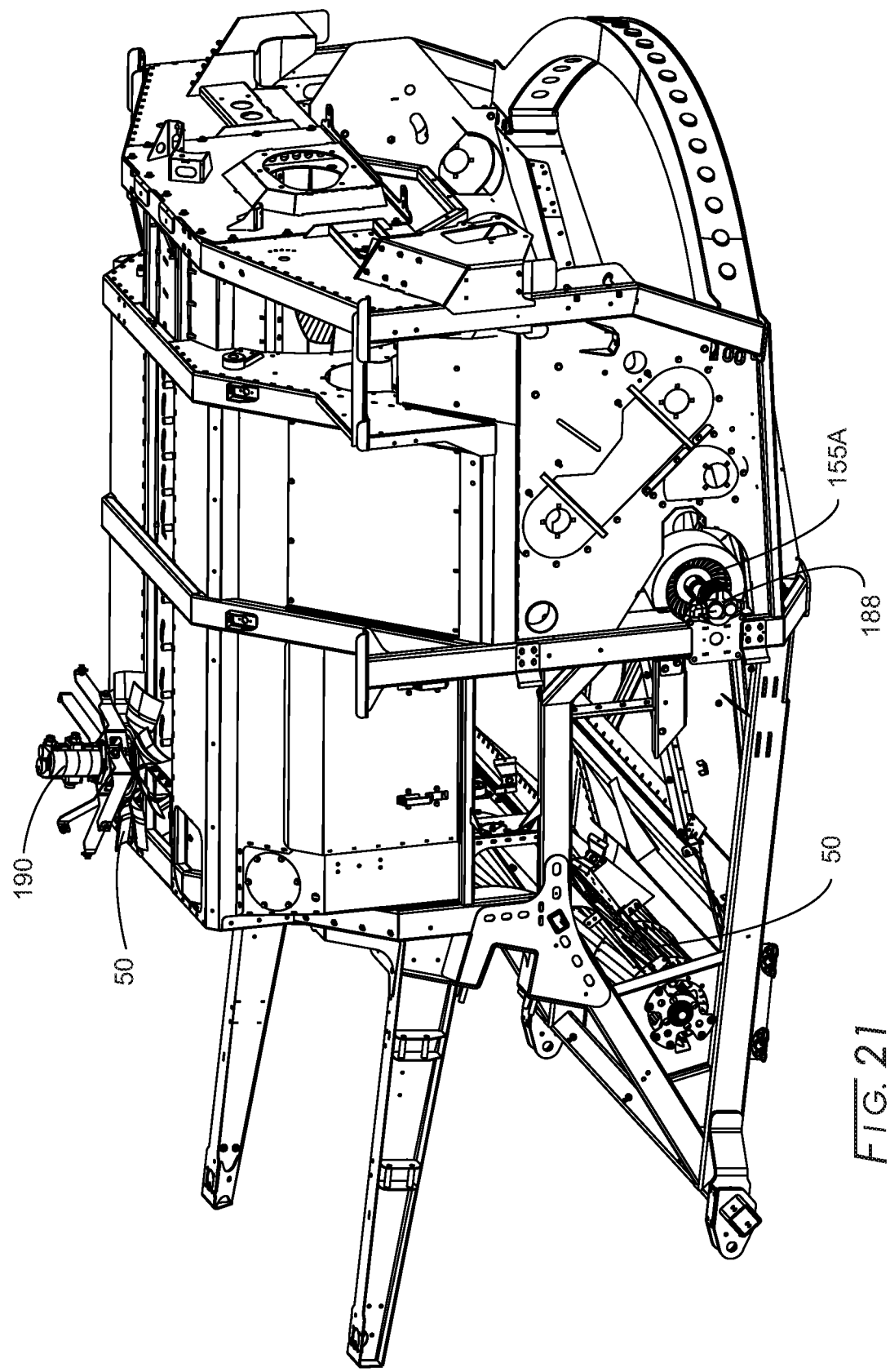
FIG. 21 is an isometric right side view of FIG. 20.
Figure 22:
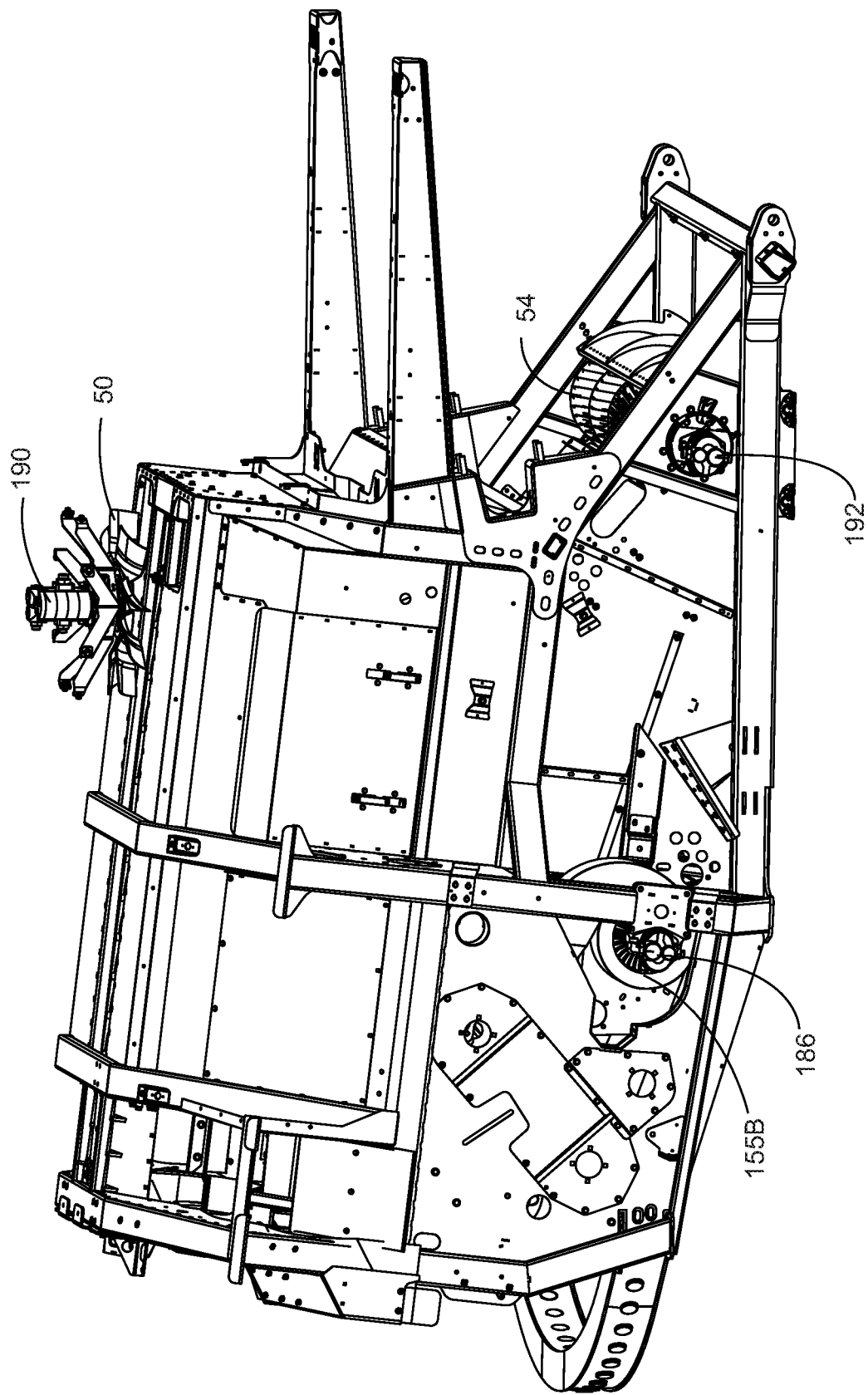
FIG. 22 is an isometric left side view of FIG. 20.

FIG. 20 shows a top view of PPU 12 and the relative fore/aft and side-to-side, while FIGS. 21 and 22 are right and left side isometric views of the same equipment as shown in FIG. 20. Relative to the hydraulic circuits, a right hand tailings fan motor, 186, for tailings fan assembly 155B (see FIG. 25), left hand tailings fan motor, 188 (see FIG. 26), for tailings fan assembly 155A (see FIG. 21), charge fan motor 190 (see FIG. 24), for charge fan assembly 50, and cleaning fan motor, 192 (see FIG. 23), for cleaning fan assembly 54. FIG. 23 through 26, then, are isometric views of the various motors and fans as shown in FIG. 20.

Combining the various pumps shown in FIGS. 20-26 into a comprehensive interconnected hydraulic circuit meeting all of their needs is shown in FIG. 27. It should be understood that such interconnected hydraulic circuit establishes that all of the pumps either throttle down together or throttle up together. The philosophy behind this design is based on the recognition that if the air flow (fan) needs of one fan assembly needs to throttle up/throttle down, then all of the other air flows (fans) similarly will need to proportionately throttle up/throttle down.

FIG. 27, then, is a simplified hydraulic circuit for the four fan motors shown in FIG. 23 through 26. Initially, a tank housing the hydraulic fluid, feeds pumps 49. The hydraulic fluid flows from pumps 49 to cleaning fan motor 192. The thickness (boldness) of the arrows in FIG. 27 indicate the relative pressure (power, so to speak) of the hydraulic fluid flowing in the indicated hydraulic lines between the various motors. The greatest hydraulic fluid pressure is in the discharge line from pump 49. The discharge hydraulic fluid from cleaning fan motor 192 flows to charge fan motor assembly 190 that has one input port and two output ports. Charge fan motor assembly 190 consists of two motors with a common connected shaft therebetween. The equal discharge in the two output ports from charge fan motor assembly 190 flows to two tailing motors 186 and 188. Again, by the thickness of the arrows, the hydraulic pressure in the output lines (arrows) from charge fan motor assembly 190 is less than the input line to charge fan motor assembly 190, and is the same pressure in both output lines. The discharge/output from tailing motors 186 and 188 is indicated in dashed arrows and flows back to the tank that supplies pump 49 with hydraulic fluid. A dashed line is used to indicate the lowest hydraulic fluid pressure in the circuit. The net result of the disclosed comprehensive interconnected hydraulic circuit is that the hydraulic flow output (pressure) fed to each fan assembly and controlled by their direct drive motors, in series, can be controlled correctly by simply and only changing the amount (pressure) of hydraulic fluid flow (pressure) produced by pump 49.

While the apparatus and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. In a harvesting combine having a forward power processing unit (PPU) having a top and sides including outer rear sides, and a rear grain cart for storage of harvested grain and connected to the PPU by an articulating joint assembly, the PPU:
    (a) powered by an internal combustion engine;
    (b) having a forward set of wheel assemblies;
    (c) a forward operator cab;
    (d) a forward bottom;
    (e) a cleaning fan assembly located about the forward bottom of the PPU, the cleaning fan assembly powered by a cleaning fan hydraulic motor assembly;
    (f) a rotor;
    (g) a concaves assembly;
    (h) a grates assembly, the concaves assembly and the grates assembly for threshing of grain from material other than grain (MOG);
    (i) shaken main sieves assemblies for separating product grain from tailings composed primarily of MOG;
    (j) a charge fan assembly located behind the forward operator cab and drawing air from about the top of the PPU and directing a portion of an air flow from the charge fan assembly downwardly into the cleaning fan assembly, the charge fan assembly powered by a charge fan assembly hydraulic motor assembly;
    (k) bonus sieves assemblies located in the outer rear of each side of the PPU for accepting the tailings from the concaves assemblies and the grates assemblies and the shaken main sieves assemblies for additional separation of grain from MOG, the bonus sieves assemblies powered by a bonus sieves assembly hydraulic motor assembly; and
    (l) a hydraulic pump fed by a tank of hydraulic fluid and powered by the internal combustion engine, the hydraulic fluid flowing in a hydraulic fluid motor circuit;

the improvement for the hydraulic fluid motor circuit comprising a hydraulic line running from the pump to the cleaning fan hydraulic motor assembly, a hydraulic line running from the cleaning fan hydraulic motor assembly to the charge fan hydraulic motor assembly, a pair of equal hydraulic lines running from the charge fan hydraulic motor assembly to each of the bonus sieves hydraulic motor assemblies, and hydraulic return lines from each of the bonus sieves hydraulic motor assemblies to the hydraulic fluid tank.

2. The improved series hydraulic fluid motor circuit of claim 1, wherein the charge fan motor assembly consists of two motors with a common connected shaft therebetween.

\* \* \* \* \*